US012637206B2

(12) United States Patent
Cox et al.

(10) Patent No.: US 12,637,206 B2
(45) Date of Patent: May 26, 2026

(54) TUNABLE MASS DAMPER ASSEMBLY FOR A ROTOR BLADE

(71) Applicant: Lockheed Martin Corporation, Bethesda, MD (US)

(72) Inventors: John C. Cox, Jupiter, FL (US); Steven P. Lozano, Stratford, CT (US); David H. Hunter, Cheshire, CT (US); Emmett Emile Menair, Stratford, CT (US); Jacob Adam Fehrman, Stratford, CT (US); John Devin Carroll, Fort Worth, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 19/230,025

(22) Filed: Jun. 5, 2025

(65) Prior Publication Data

US 2025/0296678 A1    Sep. 25, 2025

Related U.S. Application Data

(62) Division of application No. 17/233,360, filed on Apr. 16, 2021, now Pat. No. 12,330,776.

(51) Int. Cl.
| | |
|---|---|
| B64C 27/00 | (2006.01) |
| B64C 27/10 | (2023.01) |
| B64C 27/473 | (2006.01) |

(52) U.S. Cl.
CPC ........... B64C 27/001 (2013.01); B64C 27/10 (2013.01); B64C 27/473 (2013.01); B64C 2027/005 (2013.01)

(58) Field of Classification Search
CPC ..... B64C 27/001; B64C 27/10; B64C 27/473; B64C 2027/005; F16F 15/1471
See application file for complete search history.

(56) References Cited

U.S. PATENT DOCUMENTS

| | | | |
|---|---|---|---|
| 2,426,130 A | 8/1947 | Wald | |
| 2,471,687 A * | 5/1949 | Holmes | F16F 15/14 |
| | | | 416/19 |

(Continued)

FOREIGN PATENT DOCUMENTS

| | | |
|---|---|---|
| EP | 2 357 356 A2 | 8/2011 |
| JP | 2009-103147 A | 5/2009 |
| RU | 2115592 C1 * | 7/1998 |

OTHER PUBLICATIONS

Extended European Search Report on European Patent Application No. 22167284.3 dated Aug. 10, 2022 (14 pages).

(Continued)

*Primary Examiner* — Nathaniel E Wiehe
*Assistant Examiner* — Justin A Pruitt
(74) *Attorney, Agent, or Firm* — Foley & Lardner LLP

(57) ABSTRACT

A tunable mass damper assembly is attachable to a rotor blade. The tunable mass damper assembly comprises a base configured to be attached to the rotor blade and a pendulum mass structure movably attached to the base and configured to move relative to the base in accordance with a rotational speed of the rotor blade about a rotor axis. The pendulum mass structure is configured to reduce vibratory forces of the rotor blade induced by a rotation of the rotor blade about the rotor axis. An entirety of the pendulum mass structure being configured to be contained within and enclosed by the rotor blade.

19 Claims, 23 Drawing Sheets

(56) References Cited

U.S. PATENT DOCUMENTS

| | | | | |
|---|---|---|---|---|
| 3,035,643 | A | * | 5/1962 | Kelley ................ B64C 27/625 |
| | | | | 416/18 |
| 4,239,455 | A | | 12/1980 | Broekhuizen et al. |
| 4,239,456 | A | * | 12/1980 | Joglekar .............. B64C 27/001 |
| | | | | 416/500 |
| 4,527,951 | A | * | 7/1985 | Trier ....................... F16F 15/10 |
| | | | | 416/500 |
| 4,550,812 | A | * | 11/1985 | Mard .................... B64C 27/001 |
| | | | | 244/17.11 |
| 5,639,214 | A | * | 6/1997 | Guimbal ................... F16F 7/10 |
| | | | | 416/500 |
| 6,047,924 | A | | 4/2000 | Thomassin et al. |
| 6,494,680 | B2 | * | 12/2002 | Cardin ................. B64C 27/001 |
| | | | | 416/500 |
| 7,470,114 | B2 | | 12/2008 | Bonnet |
| 8,899,928 | B2 | | 12/2014 | Girard et al. |
| 10,479,494 | B2 | | 11/2019 | Certain et al. |
| 10,618,630 | B2 | | 4/2020 | Nussenblatt et al. |
| 10,822,076 | B2 | | 11/2020 | Hunter et al. |
| 10,830,067 | B2 | | 11/2020 | Kray et al. |
| 2001/0048875 | A1 | | 12/2001 | Cardin |
| 2007/0041829 | A1 | | 2/2007 | Bonnet |
| 2017/0036758 | A1 | | 2/2017 | Nussenblatt et al. |
| 2020/0200231 | A1 | * | 6/2020 | Brewer ................... F16F 9/145 |

OTHER PUBLICATIONS

Final Office Action on U.S. Appl. No. 17/233,360 dated Jan. 5, 2024 (12 pages).
Non-Final Office Action on U.S. Appl. No. 17/233,360 dated Jun. 22, 2023 (9 pages).
Non-Final Office Action on U.S. Appl. No. 17/233,360 dated May 15, 2024 (16 pages).
Notice of Allowance on U.S. Appl. No. 17/233,360 dated Feb. 26, 2025 (5 pages).

* cited by examiner

TUNABLE MASS DAMPER ASSEMBLY FOR A ROTOR BLADE

CROSS-REFERENCE TO RELATED PATENT APPLICATIONS

This application is a divisional of U.S. patent application Ser. No. 17/233,360, filed Apr. 16, 2021, which is incorporated by reference herein in its entirety.

STATEMENT REGARDING FEDERALLY SPONSORED RESEARCH OR DEVELOPMENT

This invention was made with government support under Contract No. W911W6-19-9-0005, awarded by the U.S. Army. The government has certain rights in the invention.

FIELD

The present application relates generally to tunable mass damper assemblies, such as pendulum assemblies, for a rotor blade of a rotor system of a rotary wing aircraft.

BACKGROUND

Asymmetric lift of helicopter blades in forward flight creates significant vibrations, which is a frequent problem during the operation of aircraft, in particular helicopters. Vibration is detrimental to, decreases the life of, and increases the fatigue of various fatigue-loaded components of the aircraft, such as the rotor system and the airframe. Furthermore, vibration is also detrimental to the overall performance of the aircraft, and adversely affects the human flight crew. Accordingly, it would be beneficial to attenuate or eliminate these vibrations to extend the operational life of the aircraft and improve ride characteristics.

SUMMARY

Typical dampers provide a simple weighted pendulum mechanism that is attached to the external surface of helicopter main rotor blades. Such dampers are not aerodynamic and thus increase the aerodynamic drag of the rotor system, and decrease the aerodynamic performance of the rotor blade. However, reducing aerodynamic drag and increasing aerodynamic performance are particularly important as the forward flight speed of the aircraft increases (e.g., for advanced rotorcraft). The exemplary embodiments set forth herein address these and other issues.

Various embodiments provide for a tunable mass damper assembly that is attachable to a rotor blade. The tunable mass damper assembly comprises a base configured to be attached to the rotor blade and a pendulum mass structure movably attached to the base and configured to move relative to the base in accordance with a rotational speed of the rotor blade about a rotor axis. The pendulum mass structure is configured to reduce vibratory forces of the rotor blade induced by a rotation of the rotor blade about the rotor axis. An entirety of the pendulum mass structure being configured to be contained within and enclosed by the rotor blade.

Various other embodiments provide for a tunable mass damper assembly that is attachable to a rotor blade. The tunable mass damper assembly comprises a base configured to be attached to the rotor blade and a pendulum mass structure movably attached to the base and configured to move relative to the base depending on a rotational speed of the rotor blade about a rotor axis. The pendulum mass structure is configured to reduce vibratory forces of the rotor blade induced by a rotation of the rotor blade about the rotor axis. The tunable mass damper assembly has a contoured shape in a direction between a leading edge and a trailing edge of the rotor blade.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to various internal and external tunable (or tuned) mass damper assemblies that are attachable to a rotor blade of an aircraft to isolate, counteract, and dampen vibration of the aircraft at the source of the vibration (i.e., at the rotor blade), thereby reducing the vibrations conveyed to the aircraft. By dampening the vibration, the various detrimental effects of vibration are greatly reduced, if not eliminated. Furthermore, due to the configurations of the various damper assemblies disclosed herein, the damper assemblies reduce or eliminate the aerodynamic drag of the rotor system.

Rotor System

Figure 1A:
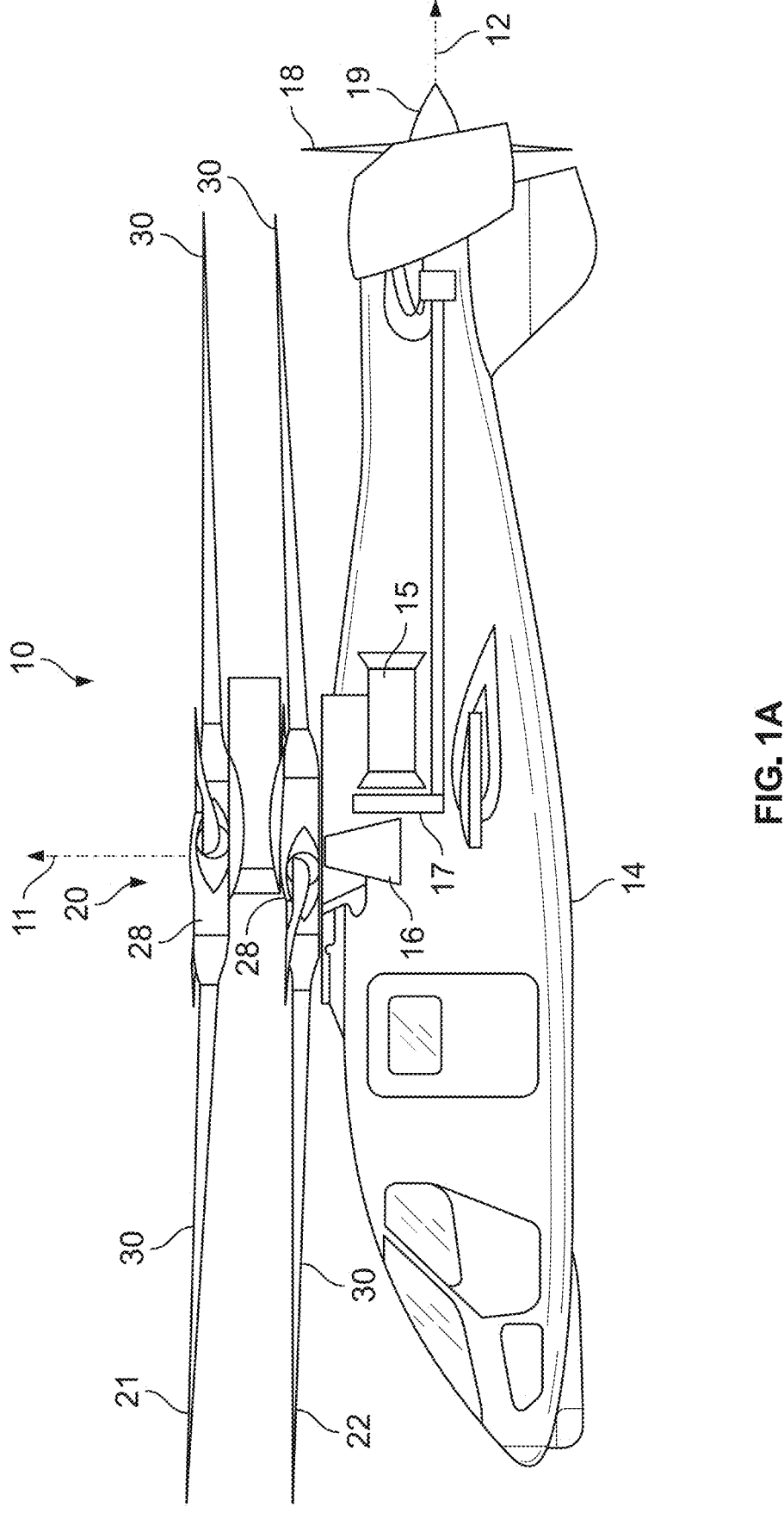
FIG. 1A is a side view of an aircraft according to one embodiment.
Figure 1B:
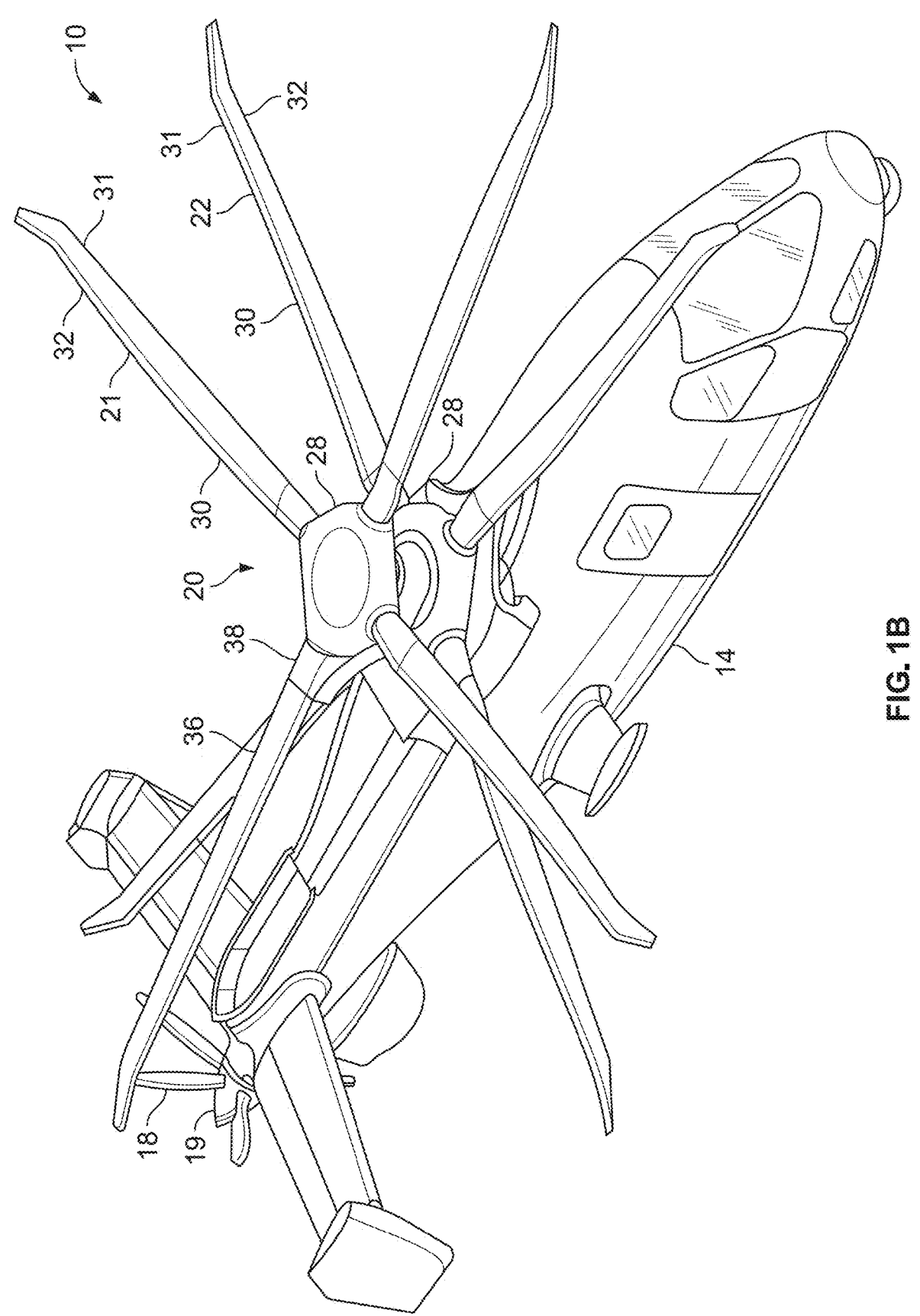
FIG. 1B is a perspective view of the aircraft of FIG. 1A.

FIGS. 1A-1B illustrate an exemplary vertical takeoff and landing (VTOL) high speed compound or coaxial counter-rotating rigid rotary wing aircraft 10 (which may be, for example only, a helicopter or a variety of other devices which include at least one rotor blade). The aircraft 10 includes an aircraft body or airframe 14, a dual, counter-rotating, coaxial main rotor system 20, a translational thrust system 18, a transmission 16, and at least one engine 15 (which may be a gas turbine engine). The overall structure and configuration of the aircraft 10 may have a variety of different configurations, including but not limited to the structures disclosed in U.S. Pat. No. 10,822,076, the entirety of which is incorporated by reference. The airframe 14 is a non-rotating frame (relative to the main rotor system 20 and the translational thrust system 18) and supports the main rotor system 20 and the translational thrust system 18.

The main rotor system 20 is driven by the transmission 16 and rotates about a hub or rotor axis 11. The main rotor system 20 may be a coaxial rotor system that includes an upper rotor assembly 21 and a lower rotor assembly 22 as dual counter-rotating main rotors in a coaxial configuration. The upper rotor assembly 21 is positioned above the lower rotor assembly 22. The upper rotor assembly 21 and the lower rotor assembly 22 are rotated about the same, single axis (i.e., the rotor axis 11) and may include concentric shafts or rotor masts. The upper rotor assembly 21 and the lower rotor assembly 22 may be rotated in opposite directions and are timed and controlled to cancel out the net torque on the other rotor assembly in real-time, thereby providing a net-zero torque about the airframe 14, increasing the stability of the aircraft 10, and increasing the hovering capabilities of the aircraft 10. However, according to various other embodiments, the main rotor system 20 may only include one rotor assembly.

Figure 2:
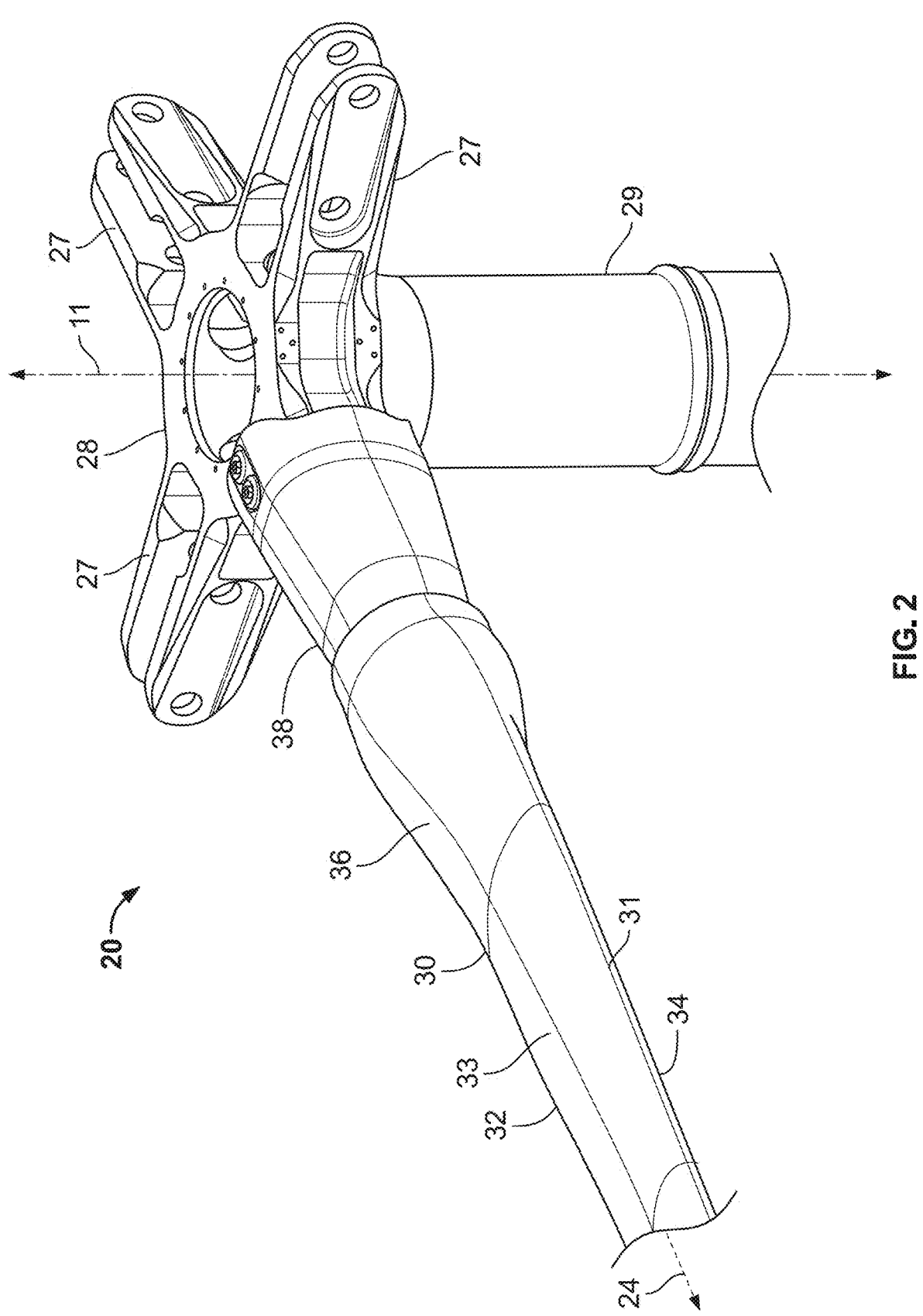
FIG. 2 is a perspective view of a portion of a rotor system that may be used within the aircraft of FIG. 1A, according to one embodiment.

The main rotor system 20 includes a plurality of main rotor blades 30 (e.g., a rotor blade spar). In particular, each of the upper rotor assembly 21 and the lower rotor assembly 22 includes a set of rotor blades 30, as well as a rotor unit or hub 28 to which each of the rotor blades 30 is attached. The rotor hub 28 is configured to rotate about the rotor axis 11 (thereby rotating the rotor blades 30 about the rotor axis 11), and the upper rotor assembly 21 or the lower rotor assembly 22 is mounted to the rotor hub 28. As shown in FIG. 2, the rotor hub 28 includes a rotor mast 29 and a plurality of extensions or projections 27. The rotor mast 29 extends upwardly along and around the rotor axis 11 and is rotated about the rotor axis 11 relative to the airframe 14 to rotate the rotor hub 28 (and thus the rotor blades 30) about the rotor axis 11. The projections 27 (which may be configured as sets of projections) each correspond to one of the rotor blades 30.

The translational thrust system 18 provides translational thrust generally parallel to an aircraft longitudinal axis 12 (that extends along the length of the aircraft 10). The translational thrust system 18 may be selected from one of a plurality of propeller systems including, but not limited to a pusher propeller, a tractor propeller, a nacelle mounted propeller, etc. In the example of FIGS. 1A-1B, the translational thrust system 18 includes an auxiliary propulsor 19. In an embodiment, the auxiliary propulsor 19 is a pusher propeller system with a propeller rotational axis oriented substantially horizontal and parallel to the aircraft longitudinal axis 12 to provide thrust for high speed flight. The translational thrust system 18 may be driven through a main gearbox 17 which also drives the main rotor system 20.

The transmission 16 includes the main gearbox 17 driven by the one or more engines 15. The main gearbox 17 and the engines 15 may be mounted on the airframe 14 of the aircraft 10. Thus, the main gearbox 17 and engines 15 form part of the overall assembly including airframe 14. In the case of a rotary wing aircraft, the main gearbox 17 may be interposed between the one or more engines 15, the main rotor system 20, and the translational thrust system 18. In one embodiment, the main gearbox 17 is a split torque gearbox which carries torque from the engines 15 through a multitude of drivetrain paths. Although a particular rotary wing aircraft configuration is illustrated and described in the disclosed non-limiting embodiment, other configurations and/or machines with rotor systems are within the scope of the present disclosure. It is to be appreciated that while the description herein relates to a rotary wing aircraft with a dual coaxial counter-rotating rotor system, the disclosure herein may be as readily applied to other rotor systems, such as turboprops, tilt-rotors, and tilt-wing aircraft, or a conventional single rotor system.

Rotor Blade

Each of the rotor assemblies 21, 22 may include any number of rotor blades 30, such as three or four rotor blades 30, that rotate with the rotor hub 28 about the rotor axis 11. Each of the rotor blades 30 is mounted to the respective rotor hub 28 of the rotor assembly 21, 22 and are circumferentially spaced apart from each other. As described further herein, an internal or external tunable mass damper assembly 50 is attached to each of the rotor blades 30.

As shown in FIG. 2, each of the rotor blades 30 includes a rotor blade body 36 and a blade neck 38. The blade neck 38 is configured to directly attach to and extend radially outwardly from the rotor hub 28. The projections 27 of the rotor hub 28 extend at least partially into an inner area of the blade neck 38. The blade body 36 directly attaches to and extends radially outwardly from the blade neck 38 and terminates at the outboard end or tip of the rotor blade 30. The blade neck 38 may optionally extend into an inner area of the blade body 36. Optionally, the blade neck 38 and the blade body 36 may be two separate components that are attachable (and removable and reattachable) to each other. Alternatively, the blade neck 38 and the blade body 36 may be constructed as a single unitary piece or component that cannot be separated without destruction.

The rotor blade 30 includes a leading edge 31 and a trailing edge 32 that extend along both the blade body 36 and the blade neck 38. The leading edge 31 is upstream edge of the rotor blade 30, and the trailing edge 32 is downstream of the rotor blade 30 in the rotational direction of travel of the rotor blade 30 about the rotor axis 11. The leading edge 31 and the trailing edge 32 extend along the radial length of the rotor blade 30 and are opposite each other.

The rotor blade 30 further includes a top side or portion 33 and a bottom side or portion 34. The top portion 33 faces upward, away from the airframe 14. The bottom portion 34 faces downward, toward the airframe 14. The top portion 33 and the bottom portion 34 extend along the radial length of the rotor blade 30, are opposite each other, and extend between the leading edge 31 and the trailing edge 32. Similarly, the leading edge 31 and the trailing edge 32 each extend between the top portion 33 and the bottom portion 34.

The longitudinal or feathering axis 24 of the rotor blade 30 refers to the axis about which the pitch angle of the rotor blade 30 is varied. In particular, the rotor blade 30 feathers or twists about its feathering axis 24 about at least one bearing to change the pitch angle, which changes the lift and drag. For example, by increasing the pitch angle, the rotor blade 30 provides more lift. Conversely, by decreasing the pitch angle, the rotor blade 30 provides less lift. As shown in FIG. 2, the feathering axis 24 extends substantially perpendicular to the rotor axis 11.

Tunable Mass Damper Assembly

According to various embodiments as shown in FIGS. 3A-14, the aircraft 10 includes at least one pendulum absorber, pendulum mechanism, swinging tunable mass assembly, or tunable mass damper device or assembly 50 (referred to herein as the "damper assembly 50"). By moving or pivoting a pendulum mass structure 60 of the damper assembly 50 vertically up and down (as described further herein), the tunable mass damper assembly 50 is configured and optimized or tuned to isolate, absorb, dissipate, mitigate, or dampen energy and vibrations of the aircraft 10 that may be caused the rotor blades 30, thereby improving the performance of the aircraft 10, reducing or eliminating rotor system 20 and airframe 14 vibration, and increasing component life, crew comfort, and aircraft endurance.

Each of the tunable mass damper assemblies 50 is configured to attach to one the rotor blades 30 and rotates with the rotor blade 30 about the rotor axis 11. Although only one rotor blade 30 is shown with the damper assembly 50 (see, for example, FIGS. 8A and 10A), a damper assembly 50 may be positioned on or within each of the rotor blades 30. Furthermore, although the damper assembly 50 is shown with the main rotor blade 30, the damper assembly 50 may be used with other types of rotor blades.

As described further herein, the damper assembly 50 may be positioned and secured internally within or externally on the rotor blade 30, both of which reduce or eliminate aerodynamic drag otherwise caused by a damper. For example, in embodiments in which the damper assembly 50 is positioned internally within the rotor blade 30, the damper assembly 50 does not cause any aerodynamic drag since the damper assembly 50 is completely enclosed by the rotor blade 30. In embodiments in which the damper assembly 50 is positioned externally on the rotor blade 30, the external damper assemblies 50 have an aerodynamic configuration (as described further herein) which reduces aerodynamic drag compared to typical dampers. As described further herein, the various embodiments disclosed herein provide a variety of different configurations, each of which achieve the desired mass/arm-length relationship within or on the confined available space of the rotor blade 30.

By attaching the damper assembly 50 to a specific location on the rotor blade 30, the vibratory forces conveyed to the rotor hub 28 and airframe 14 of the aircraft 10 (from the rotor blade 30) can be reduced. In contrast to typical dampers, the damper assembly 50 is configured to be positioned on (or within) and used with (or within) a rotor blade 30 that is part of a coaxial and/or rigid rotor system (such as the rotor system 20). The rotor system 20 may optionally be fully rigid.

In rigid rotor systems, the rotor blades 30 move vertically relative to the rotor hub 28 significantly less (if at all) compared to articulated rotor systems in which the rotor blades are configured to move or "flap" vertically upward and downward relative to the rotor hub as a result of aerodynamic loads. For example, in rigid rotor systems, the rotor blades 30 may be statically attached to the rotor hub 28 and cannot articulate relative to the rotor hub 28 (which may increase the loads and vibrations), whereas in articulated rotor system, the rotor blades may be hingedly (and movably) attached to the rotor hub. Articulated rotor systems are used primarily in lower speed flight regimes, where aerodynamic drag is not as significant a factor and an external configuration may be acceptable. Comparatively, in rigid rotor systems, which are used for high speed flight regimes, aerodynamic drag is more of a concern. As described further herein, the various embodiments of the damper assembly 50 reduce the aerodynamic drag compared to typical damper assemblies and therefore can be used with rigid rotor systems (e.g. fully rigid systems).

As shown in the various embodiments (see, for example, FIGS. 3B and 8C, among others), each of the damper assemblies 50 include a base 52 and a pendulum mass structure 60. The mounting bracket or base 52 is configured to be rigidly or movably attached or secured to the rotor blade 30. In particular, according to various embodiments as shown, for example, in FIGS. 7B and 8C, the base 52 is rigidly secured to the rotor blade 30. According to various other embodiments as shown, for example, in FIG. 3B, the base 52 is movably secured to the rotor blade 30, as described further herein. As also described further herein, depending on whether the damper assembly 50 is internal or external to the rotor blade 30, the base 52 is configured to attach to the rotor blade 30 and be positioned along either along an inner surface or an outer surface of the rotor blade 30.

The pendulum mass assembly or structure 60 is movably attached to the base 52 and is configured to move relative to the base 52 depending on a rotational speed of the rotor blade 30 about the rotor axis 11. The pendulum mass structure 60 is configured to reduce vibratory forces of the rotor blade 30 by moving relative to the base 52. The pendulum mass structure 60 comprises a pendulum mass 70 and at least one pendulum arm 80, both of which are movable relative to the base 52 (and may either be movably or statically attached to each other). The pendulum mass structure 60 is oriented on or within the rotor blade 30 such that the pendulum mass 70 is closer to the outermost radial end of the rotor blade 30 than the pendulum arm 80, and the pendulum arm 80 is closer to the innermost radial end of the rotor blade 30 (and therefore closer to the rotor hub 28) than the pendulum mass 70.

The cantilever or pendulum weight or mass 70 is a weight portion of the pendulum mass structure 60 that is substantially heavier and greater in mass than the pendulum arm 80. The mass or weight of the pendulum mass 70 can vary (according to various designs), depending on the specific natural frequency of the aircraft 10 for the damper assembly 50 to counteract. The pendulum mass 70 includes a first mass end 71 and a second mass end 72 that are opposite each other in a direction along the pivot axis 64 (as described further herein). The first mass end 71 is closer to the leading edge 31 of the rotor blade 30 (than the second mass end 72), and the second mass end 72 is closer to the trailing edge 32 of the rotor blade 30 (than the first mass end 71). Accordingly, the first mass end 71 is upstream, and the second mass end 72 is downstream (relative to each other) in the rotational direction of travel of the respective rotor blade 30 about the rotor axis 11.

A first mass side of the pendulum mass 70 is directly attached to the second arm end 82 of the pendulum arm 80 (as described further herein), and a second mass side (that is opposite the first mass side) is not contacting another structure when the pendulum mass structure 60 is not abutting one of the stops 58, 59 (as described further herein). Accordingly, when the pendulum mass structure 60 is not abutting one of the stops 58, 59, the pendulum mass 70 is attached to the rest of the aircraft 10 only via the pendulum arm 80. Optionally, the damper assembly 50 (in particular the pendulum mass structure 60) may include only a single pendulum mass 70.

The swing or pendulum bracket or arm 80 extends from the first mass side of the pendulum mass 70 and spaces the pendulum mass 70 radially from the base 52 by a distance (which is correlated to the length of the pendulum arm 80). The length of the pendulum arm 80 can vary (according to various designs), depending on the specific natural frequency of the aircraft 10 for the damper assembly 50 to counteract. As shown, for example, in FIGS. 6, 7B, 8G, and 14, the pendulum arm 80 includes a first arm end 81 and a second arm end 82. The first arm end 81 of the pendulum arm 80 is movably, hingedly, pivotably, or rotatably attached to the base 52 via a shaft, bolt, or hinge pin that extends along the pivot axis 64. The second arm end 82 of the pendulum arm 80 is directly attached to the pendulum mass 70. Optionally, the motion of the pendulum mass structure 60 (in particular, the motion of the pendulum arm 80) may be resisted by a load to control the movement of the pendulum mass structure 60.

Figure 14:
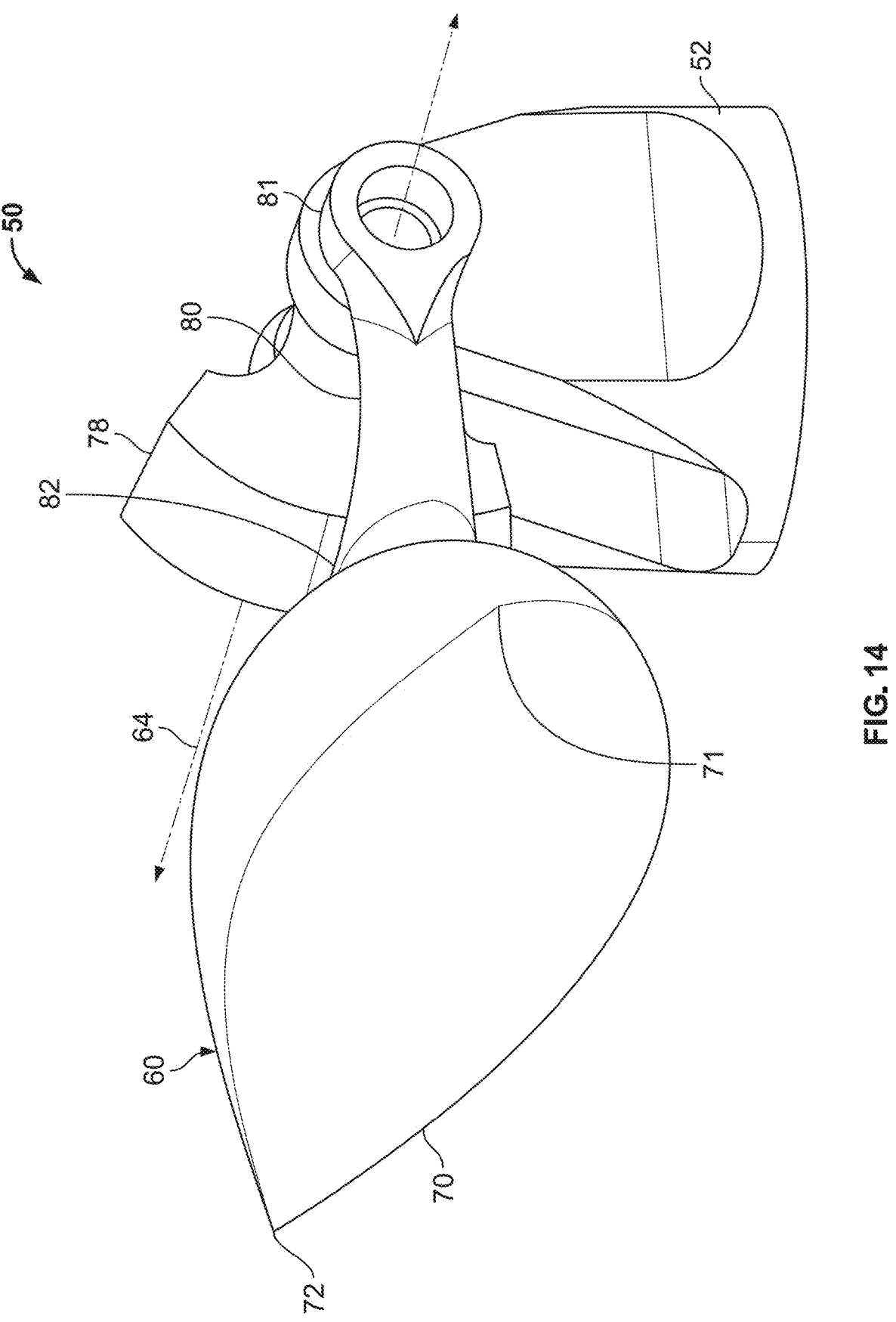
FIG. 14 is a perspective view of a damper assembly according to another embodiment.

According to various embodiments, the pendulum mass 70 and the second arm end 82 of the pendulum arm 80 are either movably, hingedly, pivotably, or rotatably attached together (via a shaft, bolt, or hinge pin that extends substantially parallel to the pivot axis 64 and as shown in various embodiments, such as FIGS. 7A-7E) or statically or rigidly attached together (as shown in various embodiments, such as FIG. 14). Furthermore, the pendulum mass 70 and the pendulum arm 80 may be two separate components that are attachable to each other or may be constructed as a single unitary piece or component that cannot be separated without destruction.

Figure 4:
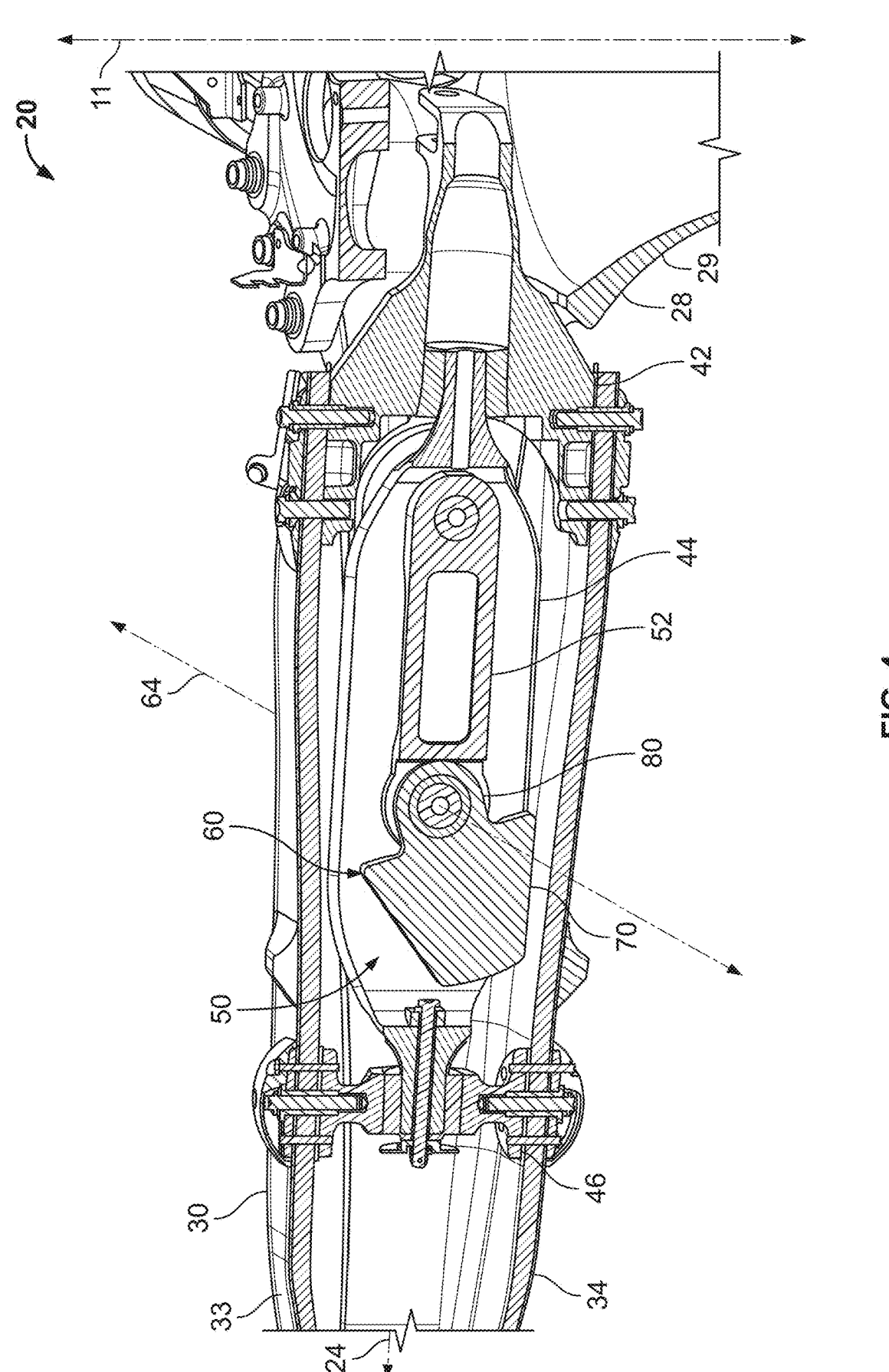
FIG. 4 is a cross-sectional view of a rotor system with a damper assembly according to another embodiment.
Figure 8A:
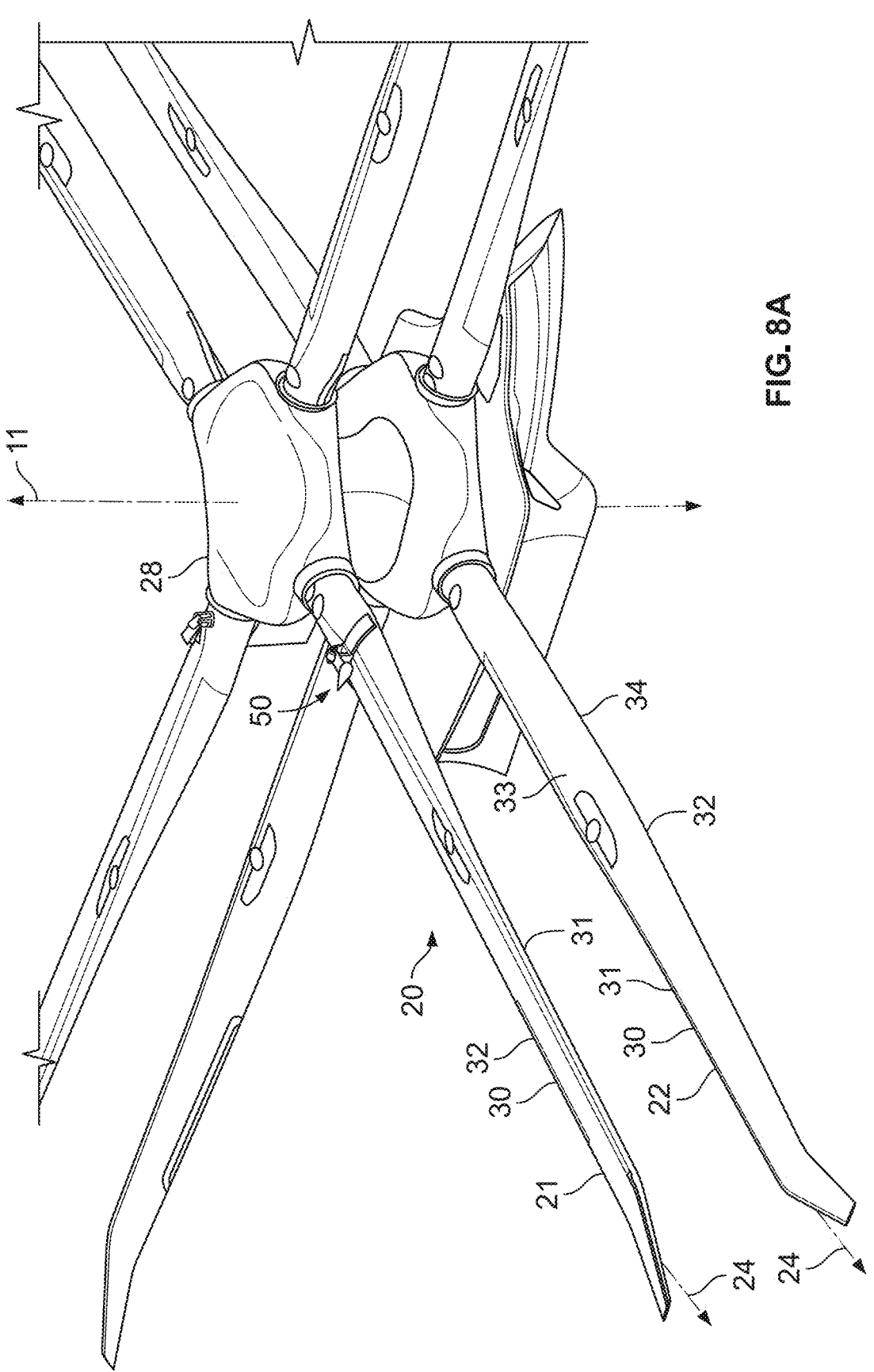
FIG. 8A is a perspective view of a rotor system according to another embodiment.
Figures 8B, 8C:
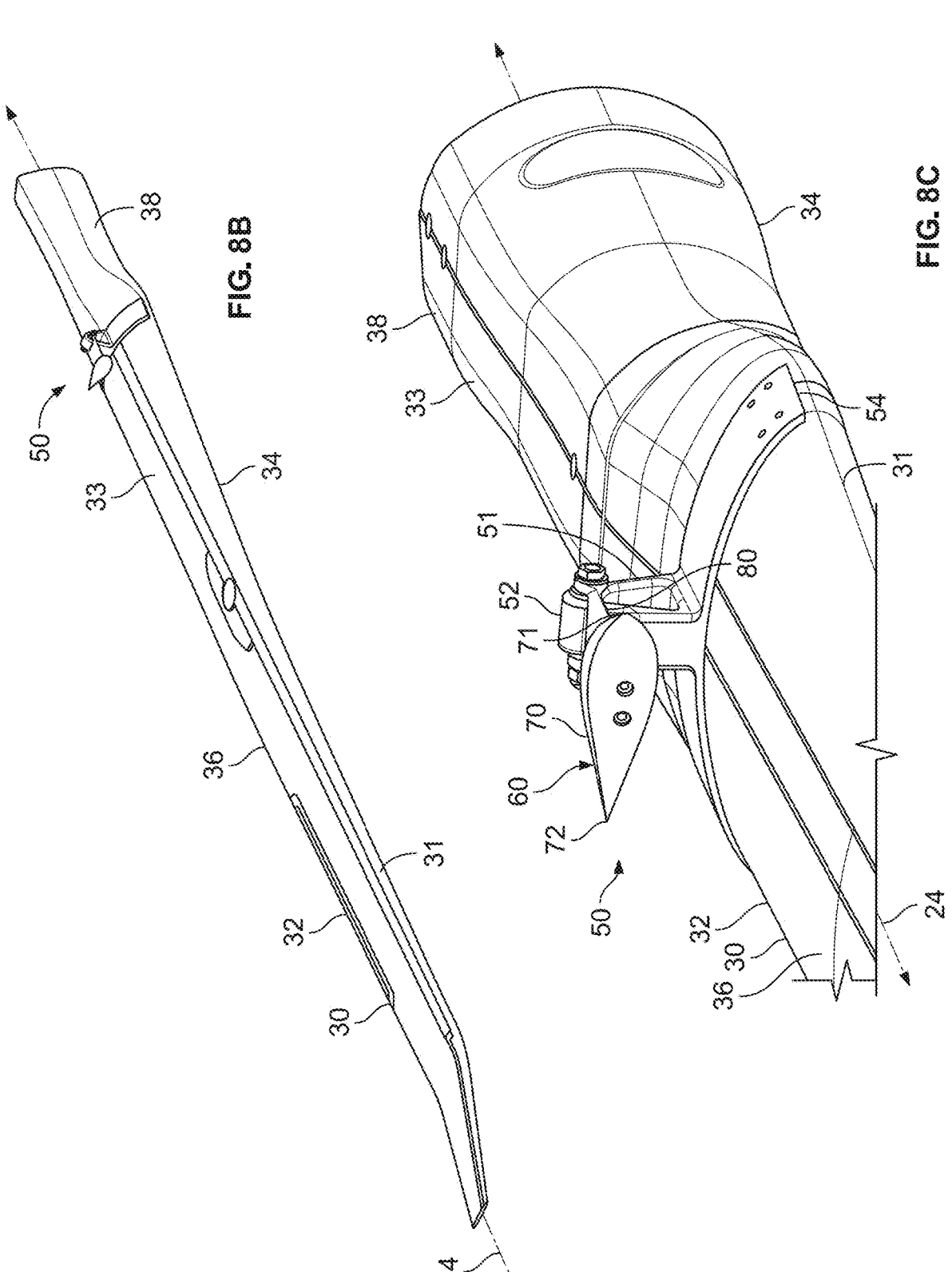
FIG. 8B is a perspective view of a rotor blade and a damper assembly of the rotor system of FIG. 8A.
FIGS. 8C-8D are perspective views of portions of FIG. 8B.
Figure 13:
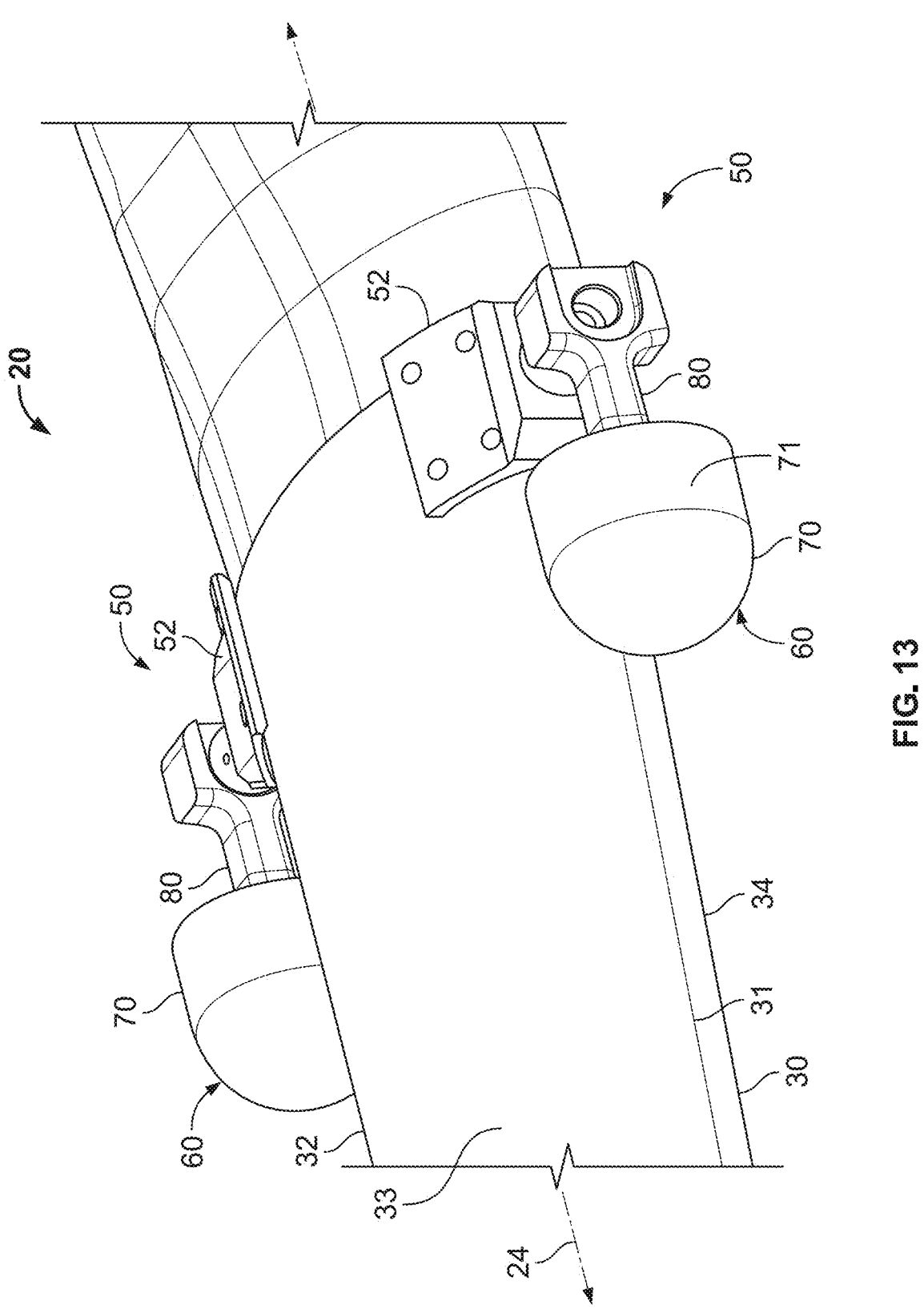
FIG. 13 is a perspective view of a portion of a rotor system according to another embodiment.

The pendulum mass structure 60 is configured to be positioned along and move vertically along a vertical plane that is substantially parallel to the feathering axis 24 of the rotor blade 30 and the rotor axis 11 such that the pendulum mass structure 60 moves substantially perpendicular to the feathering axis 24 of the rotor blade 30. In particular, the pendulum arm 80 extends substantially parallel to the feathering axis 24 and rotates about a pivot axis 64 that is substantially perpendicular to the feathering axis 24 and the rotor axis 11, as shown in FIG. 4. Optionally, the pendulum mass structure 60 may be centered on the rotor blade 30 (e.g., centered between the leading edge 31 and the trailing edge 32) and aligned with the feathering axis 24 (as shown in FIG. 8B) or offset from the center and the feathering axis 24 and positioned along either the leading edge 31 or the trailing edge 32 (as shown in FIG. 13). The damper assembly 50 is positioned such that the base 52 is positioned radially inward from the pendulum mass structure 60 (in particular from the pendulum mass 70), and the pendulum arm 80 extend radially between the base 52 and the pendulum mass 70.

To tune the damper assembly 50 to the specific natural frequency of the aircraft 10 (and/or the rotor blade 30), the operating frequencies of the aircraft 10 can be predicted and measured (in-flight) to the extent that the physical structure and performance parameters of the rotor blade 30 are known or may be estimated. These operating frequencies are directly correlated to vibrations (e.g., the natural frequency) experienced by the rest of the aircraft 10. The mass of the pendulum mass 70 and the length of the pendulum arm 80 (and their ratio) are tuned to this natural frequency which is specific to the rotor blade 30 or aircraft 10.

To counteract the vibrations of the aircraft (that are created by the rotor blades 30), the damper assembly is attached to the rotor blade 30, which is a vibrating structure. When the damper assembly 50 is excited by the vibration of the rotor blade 30, the damper assembly 50 induces a vibratory force that acts out-of-phase to the vibratory force of the rotor blade 30, thereby reducing the overall vibration.
Range of Motion of the Damper Assembly FIGS. 7C-7E, 9A-9C, and 11A-11C show the range of motion of the damper assembly 50. The damper assembly 50 and/or the rotor blade 30 may include at least one stop (preferably a lower stop 58 and an upper stop 59) that limits the downward and upward travel of the pendulum mass structure 60, respectively, through the range of motion as the rotor blade 30 (with the pendulum mass structure 60) is either at rest or rotates about the rotor axis 11. The pendulum mass structure 60 includes a first portion 61 and a second portion 62 that are configured to abut the lower stop 58 and the upper stop 59 in the lowermost and uppermost positions of the pendulum mass structure 60, respectively. Accordingly, the pendulum mass 70 may vertically swing or pitch freely (or with restrained motion) as the first and second portions 61, 62 of the pendulum mass structure 60 move between the lower stop 58 and the upper stop 59.

Depending on the embodiment and as described further herein, the first portion 61 and the second portion 62 of the pendulum mass structure 60 may refer to or include opposite sides of the pendulum arm(s) 80, opposite sides of the pendulum mass 70, opposite sides of an arm extension 83 of the pendulum arm 80, and/or opposite sides of a connector 57. Furthermore, depending on the embodiment, the lower stop 58 and the upper stop 59 may refer to or include an upper surface and a lower surface of the base 52, the respective inner surfaces of the bottom portion 34 and the top portion 33 of the rotor blade 30, inner surfaces of the base 52, and/or respective outer surface of the bottom portion 34 and the top portion 33 of the rotor blade 30.

Figures 7A, 7B:
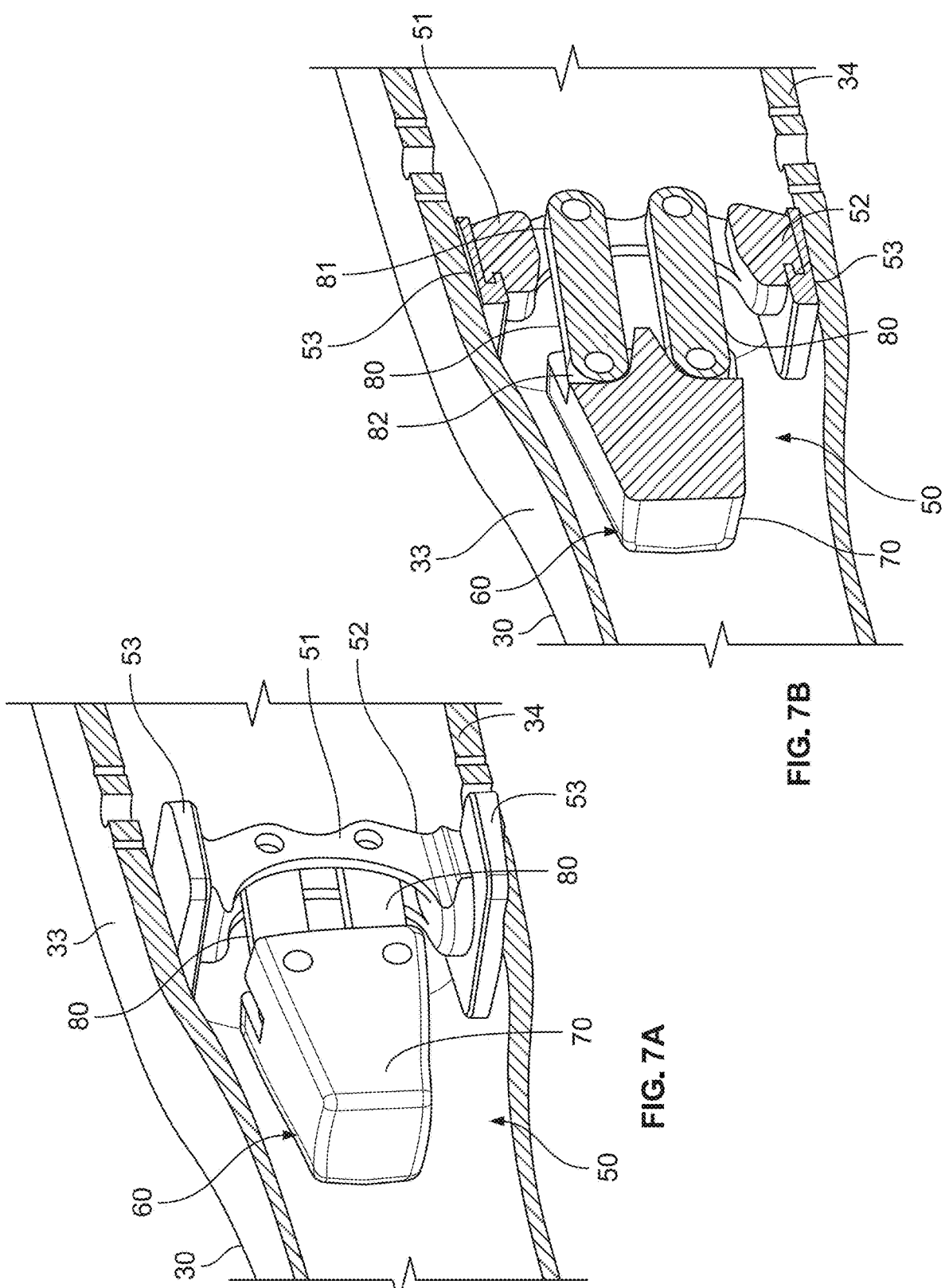
FIG. 7A is a partial cross-sectional view of a portion of a rotor system according to another embodiment.
FIG. 7B is a cross-sectional view of FIG. 7A.
Figure 7C:
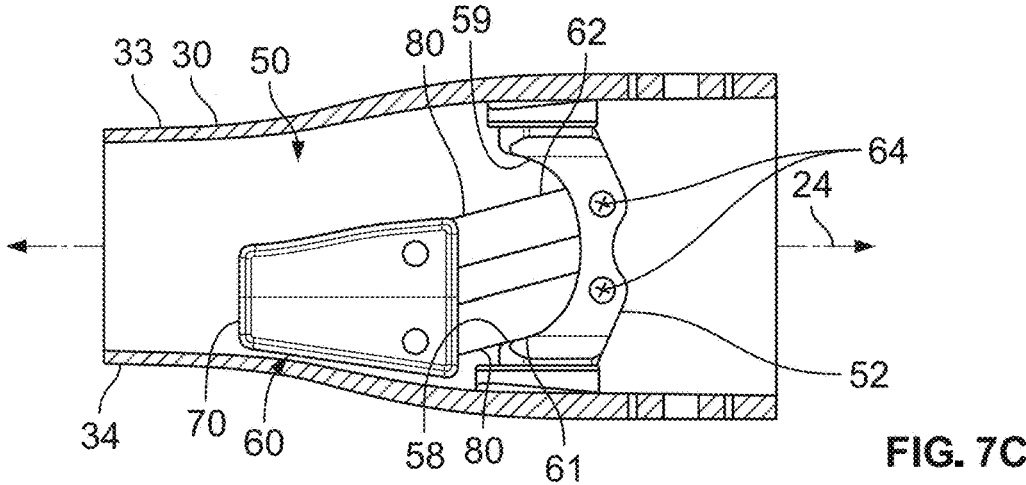
FIGS. 7C-7E is the rotor system of FIG. 7A with a pendulum mass structure in different positions.
Figure 7D:
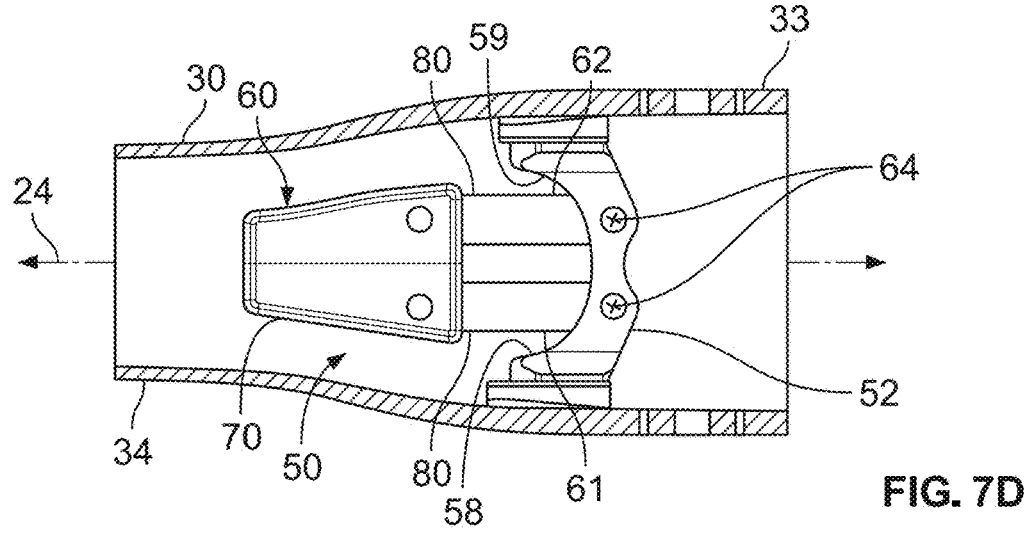
Figure 7E:
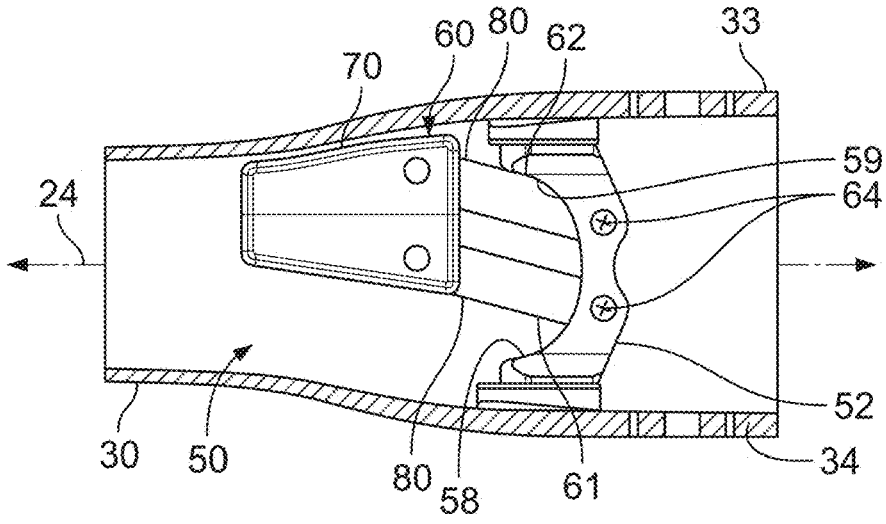
Figure 9A:
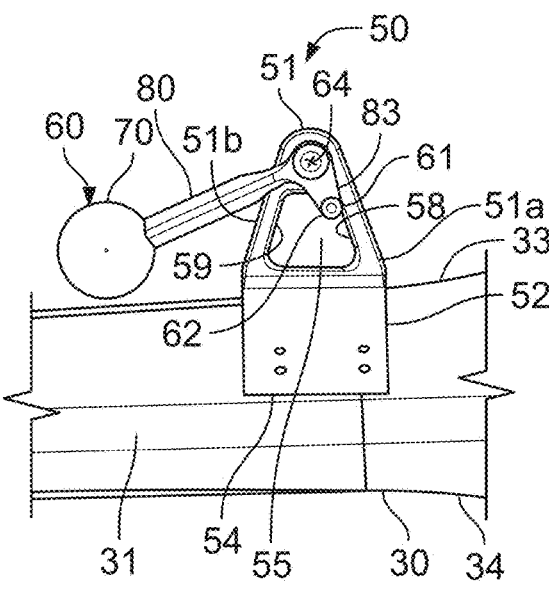
FIGS. 9A-9C are side view of the rotor system of FIG. 8B with a pendulum mass structure in different positions.
Figure 9B:
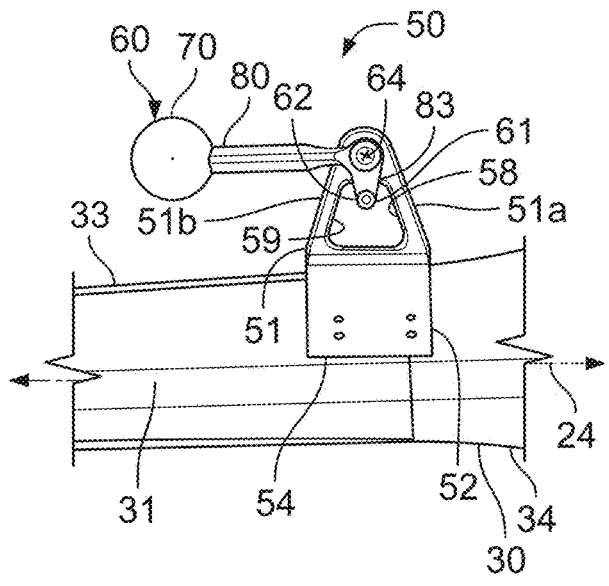
Figure 9C:
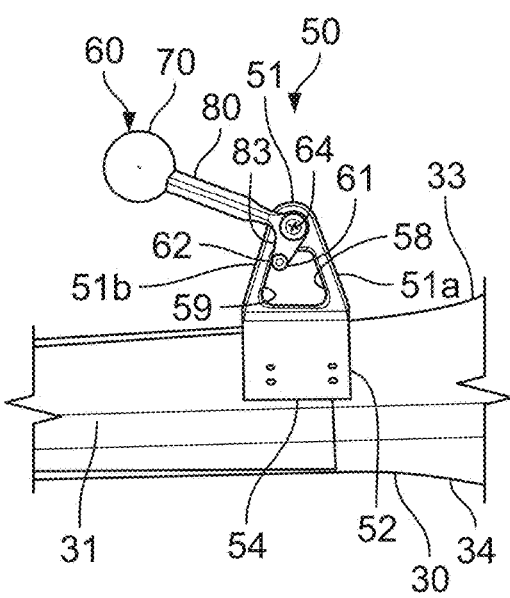

For example, according to embodiment as shown in FIGS. 7C-7E and as described further herein, the base 52 (and/or the inner surface of the rotor blade 30) includes the lower stop 58 and the upper stop 59 that are below and above the pendulum mass structure 60 and abut the first portion 61 and the second portion 62 in the lowermost and uppermost positions, respectively. According to another embodiment as shown in FIGS. 9A-9C and as described further herein, the base 52 includes the lower stop 58 and the upper stop 59 that abut the first portion 61 and the second portion 62 in the lowermost and uppermost positions, respectively. According to another embodiment as shown in FIGS. 11A-11C and as described further herein, the rotor blade 30 includes the lower stop 58 and the upper stop 59 that abut the first portion 61 and the second portion 62 in the lowermost and uppermost positions, respectively.

Figure 11A:
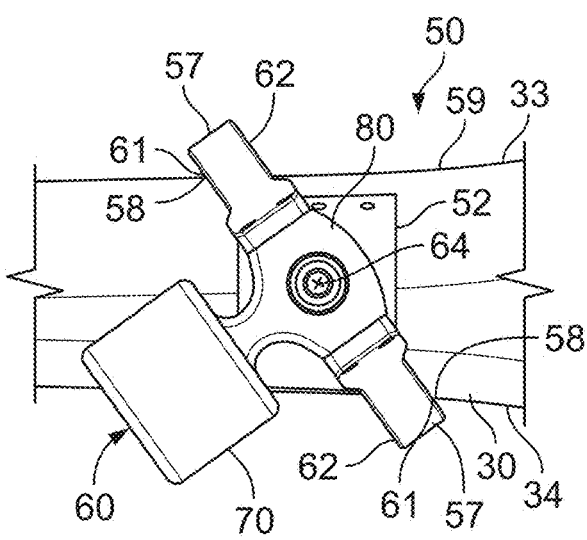
FIGS. 11A-11C are side view of the rotor system of FIG. 10B with a pendulum mass structure in different positions.

FIGS. 7C-7E, 9A-9C, and 11A-11C show exemplary ranges of motion of the pendulum mass structure 60 as at least a portion of the pendulum mass structure 60 pitches about at least one pivot axis 64 relative to the base 52 to dampen out the vibration. When the rotor system 20 is not spinning and at rest (as shown in FIGS. 7C, 9A, and 11A), the first portion 61 of the pendulum mass structure 60 rests on top of or abuts the lower stop 58 due to gravity, and the lower stop 58 prevents the pendulum mass structure 60 from moving any further lower. Accordingly, FIGS. 7C, 9A, 11A show the maximum down stroke and the lower range of motion and lowermost position of the pendulum mass structure 60.

Figure 11B:
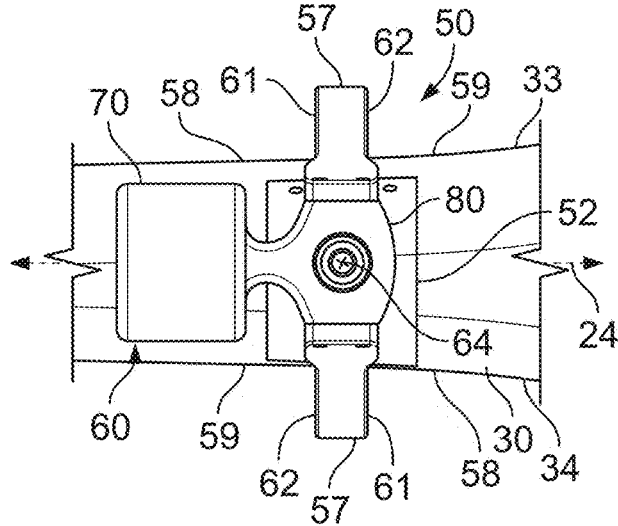

When the rotor system 20 begins spinning in-flight (as shown in FIGS. 7D-7E, 9B-9C, and 11B-11C), a centrifugal force field will cause the pendulum mass 70 and the pendulum arm 80 to swing radially outwardly (toward the outboard end of the rotor blade 30) into an extended position and approach (or surpass) being positioned in a horizontal plane parallel to the feathering axis 24 of the rotor blade 30 to move substantially perpendicular to the feathering axis 24. FIGS. 7D, 9B, and 11B show the fully extended position in which the first and second portions 61 and 62 of the pendulum mass structure 60 are centered between the lower stop 58 and the upper stop 59, and the pendulum arm 80 is approximately horizontal (and parallel to the feathering axis 24).

Figure 11C:
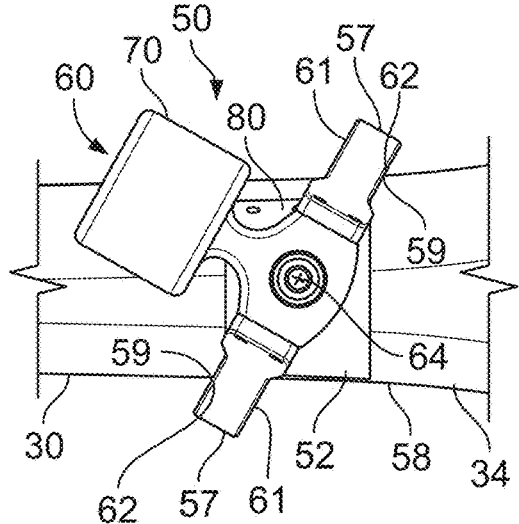

FIGS. 7E, 9C, and 11C show the maximum up stroke and the upper range of motion and uppermost position of the pendulum mass structure 60. In this position, the second portion 62 of the pendulum mass structure 60 abuts the upper stop 59, and the upper stop 59 prevents the pendulum mass structure 60 from moving further upward during movement, thereby restraining movement beyond a given position.

Internal Tunable Mass Damper Assembly

According to various embodiments shown in FIGS. 3A-7E, the tunable mass damper assembly 50 is an internal tunable mass damper assembly. With an internal damper assembly 50, an entirety of the pendulum mass structure 60 (and optionally the entirety of the internal damper assembly 50, including an entirety of both the base 52 and the pendulum mass structure 60) is configured to be contained, positioned internally within, and completely enclosed by the rotor blade 30.

By positioning the damper assembly 50 internally within the rotor blade 30, most or all of the aerodynamic drag that would otherwise be caused by the damper assembly 50 is avoided (i.e., there is no drag penalty as a result of the internal damper assembly 50). This is particularly important for coaxial aircraft where the main rotor blade count is doubled, which would multiply and significantly increase any aerodynamic drag impact as a result from a damper. This is in contrast to dampers which are not configured to be positioned internally within a rotor blade and instead are externally attached to the outer mold line ("OML") of the rotor blade, which produces aerodynamic drag (unlike the internal damper assembly 50). For a high speed aircraft in particular, this increase in aerodynamic drag is not an acceptable performance loss. Furthermore, by positioning the damper assembly 50 internally, all of the components of the damper assembly 50 are enclosed, thereby preventing any components from exiting the aircraft 10 in the event of failure.

The rotor blade designs of existing aircraft may not have sufficient internal volume for a conventional damper to properly function within the rotor blade. For example, in articulated rotor systems (in which the rotor blades are hingedly attached to the rotor hub), the inboard locations of the rotor blade do not need a large spar because the moments are relatively low and the added size would only add to the weight of the rotor system. In typical rigid rotor systems, the size of the blade profile is minimized to use the smallest geometry acceptable to manage the higher bending moments, while optimizing the aerodynamic behavior. However, it has been found that having a larger spar (blade) geometry provides a superior overall system with the rigid rotor. The larger blade geometry allows the damper assembly 50 to be positioned internally within the rotor blade 30, in particular for flight applications where an external damper would significantly worsen the performance of the aircraft.

As described further herein, the internal damper assembly 50 may be attached to the rotor blade 30 in a variety of different ways. For example, as shown in FIGS. 3B-4, the rotor blade 30 is movably secured (via the center block 44, for example) to the rotor blade 30 such that the damper assembly 50 (including both the base 52 and the pendulum mass structure 60) does not pitch with the rotor blade 30 when the rotor blade 30 rotates about the feathering axis 24 to change a pitch angle. Alternatively, as shown in FIGS. 7A-7E, the base 52 of the damper assembly 50 is directly attached to the rotor blade 30 (with the base 52 statically or rigidly secured to the rotor blade 30) such that the damper assembly 50 (including both the base 52 and the pendulum mass structure 60) pitches with the rotor blade 30 when the rotor blade 30 rotates about the feathering axis 24 to change a pitch angle.

According to one embodiment shown in FIGS. 3A-3D, the rotor system 20 includes a composite or tension strap 41, an inboard bearing block 42, a center block 44, an outboard bearing block 46, and an elastomeric trust bearing 48 along each of the sets of projections 27 of the rotor hub 28 and within each rotor blade 30. The tension strap 41 reacts the centrifugal force back into the rotor hub 28. The tension strap 41 is attached to each of the projections 27 (within a set of projections 27 corresponding to one rotor blade 30) and extends around a radial end of these various components (which includes the damper assembly 50) that are surrounded by the two projections 27. The overall structure and configuration of the tension strap 41 may have a variety of different configurations, including but not limited to the configurations disclosed in U.S. Pat. No. 10,618,630, the entirety of which is incorporated by reference (including for the depicted structures and descriptions thereof therein).

Figure 3A:
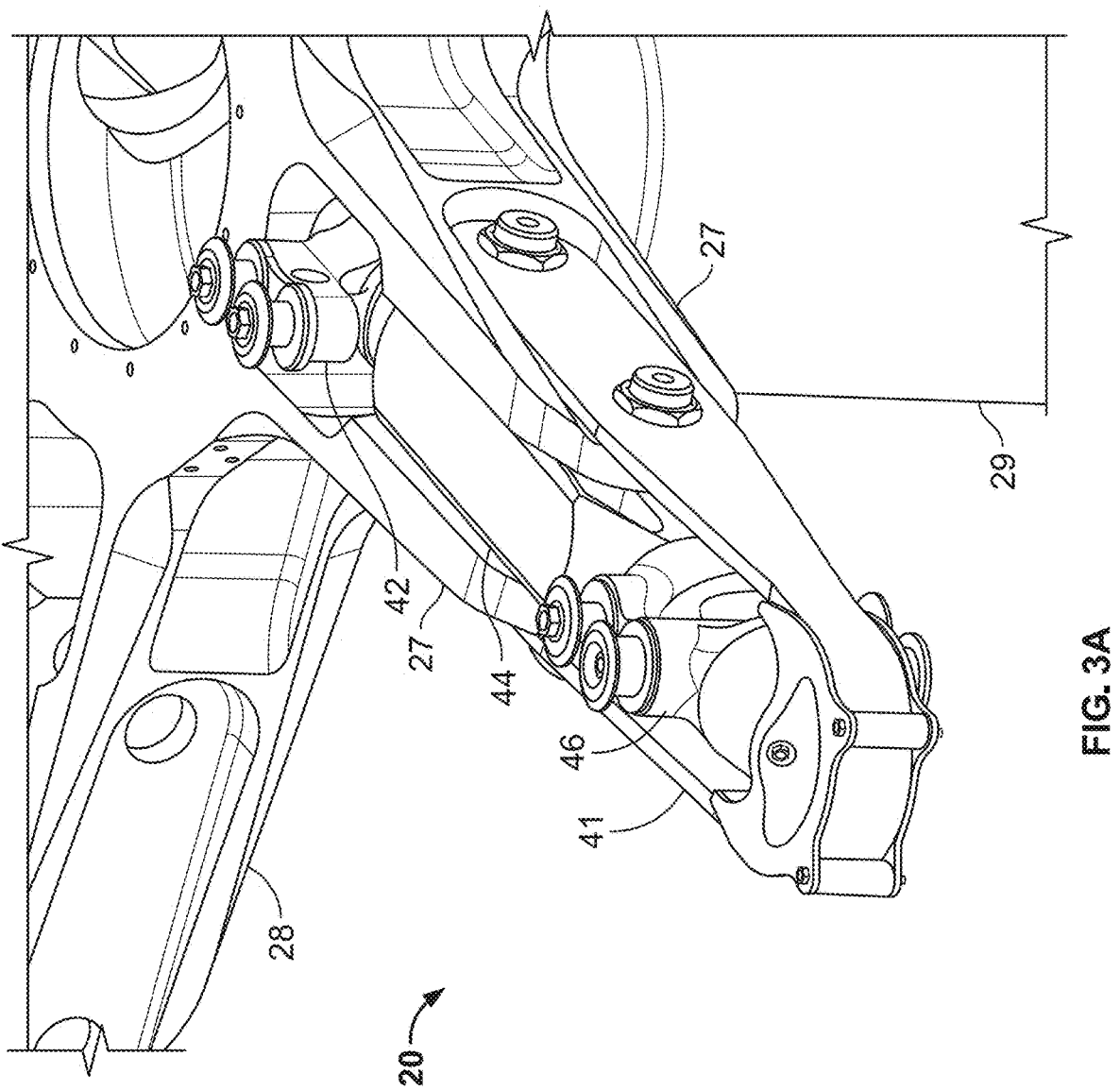
FIG. 3A is a perspective view of a portion of the rotor system of FIG. 2, according to one embodiment.
Figure 3B:
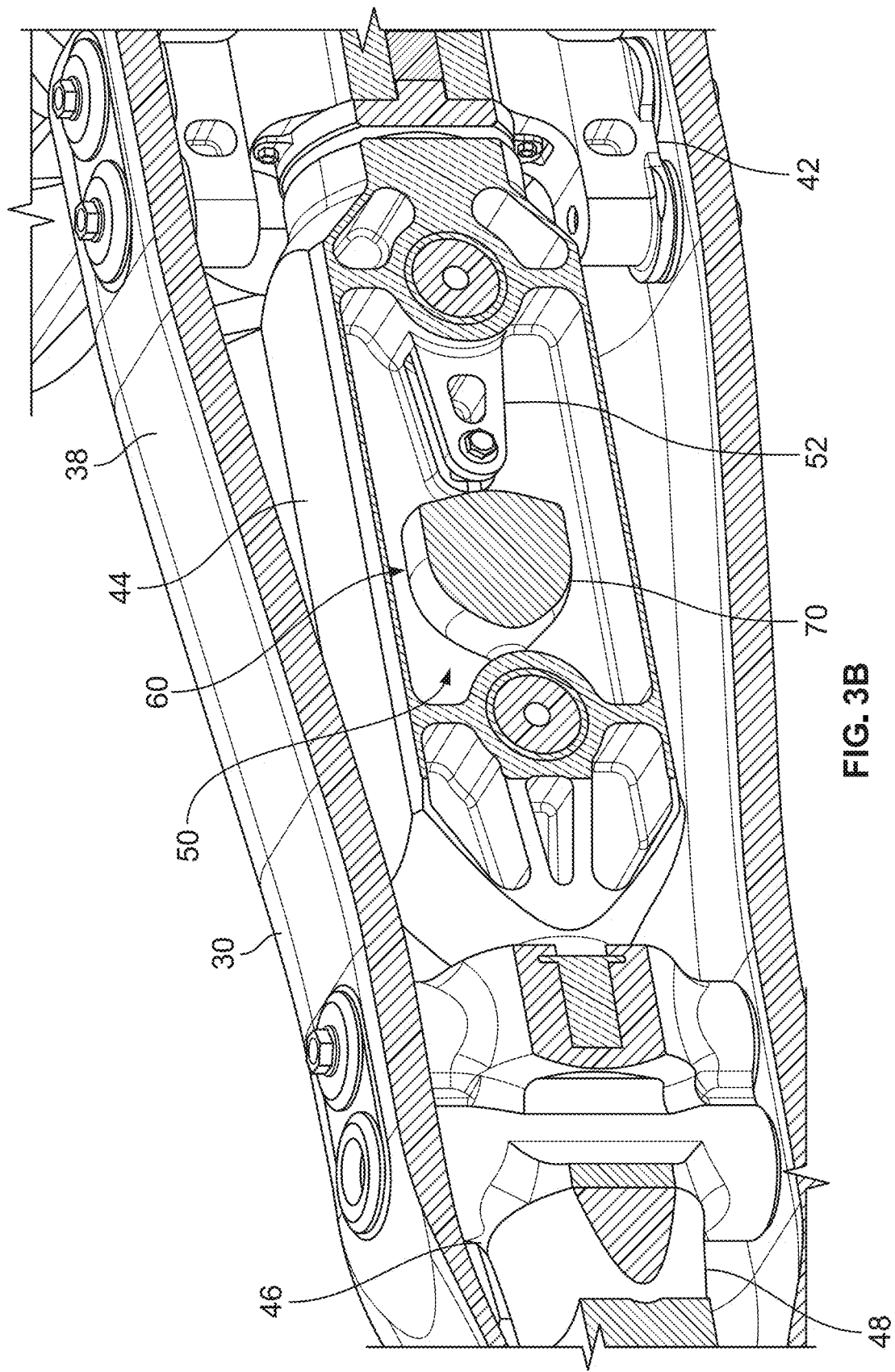
FIG. 3B is a cross-sectional view of a portion of FIG. 3A.

As shown in FIG. 3A, the inboard bearing block 42, the center block 44, the outboard bearing block 46, and the elastomeric trust bearing 48 are radially aligned with each other, attached to each other via bearings, at least partially surrounded by and positioned between the two projections 27, and positioned radially between the tension strap 41 and the center portion of the rotor hub 28. The inboard bearing block 42, the center block 44, the outboard bearing block 46, and the elastomeric trust bearing 48 may be positioned within the blade neck 38 of the rotor blade 30. The inboard bearing block 42 is positioned radially inward from the center block 44 and the outward bearing block 46. The center block 44 is positioned radially between the inboard bearing block 42 and the outboard bearing block 46. The outboard bearing block 46 is positioned radially outward from the center block 44 and the inboard bearing block 42. The elastomeric trust bearing 48 is positioned radially outward from the outboard bearing block 46 and may be compressible.

Figures 3C, 3D:
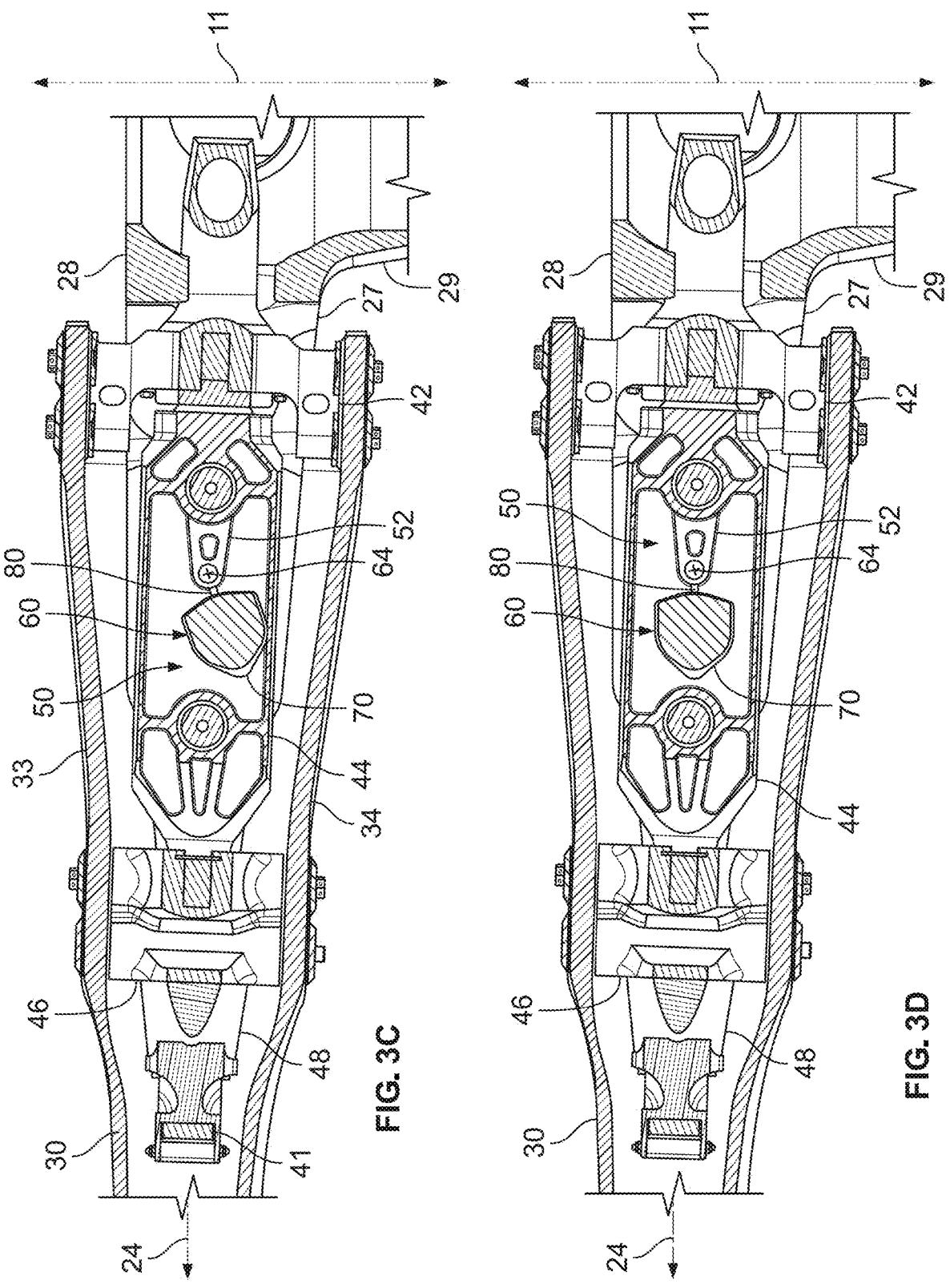
FIGS. 3C-3D are cross-sectional views of a portion of FIG. 3A with a pendulum mass structure in different positions.

As shown in FIGS. 3C-3D, the inboard bearing block 42 and the outboard bearing block 46 each statically attach to and rotate with the rotor blade 30 as the rotor blade 30 pitches about the feathering axis 24. The center block 44 is rotatably attached to the inboard bearing block 42 and the outboard bearing block 46 along its radial ends (via bearings) such that the rotor blade 30, the inboard bearing block 42, and the outboard bearing block 46 rotate along the feathering axis 24 relative to the center block 44 (and anything positioned within the center block 44).

As shown in FIGS. 3B-3D, the damper assembly 50 is positioned and housed within the center block 44. Accordingly, the rotor blade 30, the inboard bearing block 42, and the outboard bearing block 46 pitch about the feathering axis 24 relative to both the center block 44 and the damper assembly 50 (and the center block 44 and the damper assembly 50 of FIGS. 3B-3D do not pitch with the rotor blade 30 as the rotor blade 30 pitches or rotates about the feathering axis 24). The base 52 of the damper assembly 50 is statically attached to an inner portion of the center block 44, and the pendulum mass structure 60 (including the pendulum mass 70 and the pendulum arm 80) is rotatably attached to the base 52, as described further herein. FIGS. 3C-3D show how the pendulum mass structure 60 pitches about the pivot axis 64 relative to the base 52 to dampen out the vibration.

FIG. 4 shows another embodiment of an internal damper assembly 50 that is also positioned within the center block 44. However, the base 52 may optionally be movably attached to an inside portion of the center block 44.

Figures 5A, 5B:
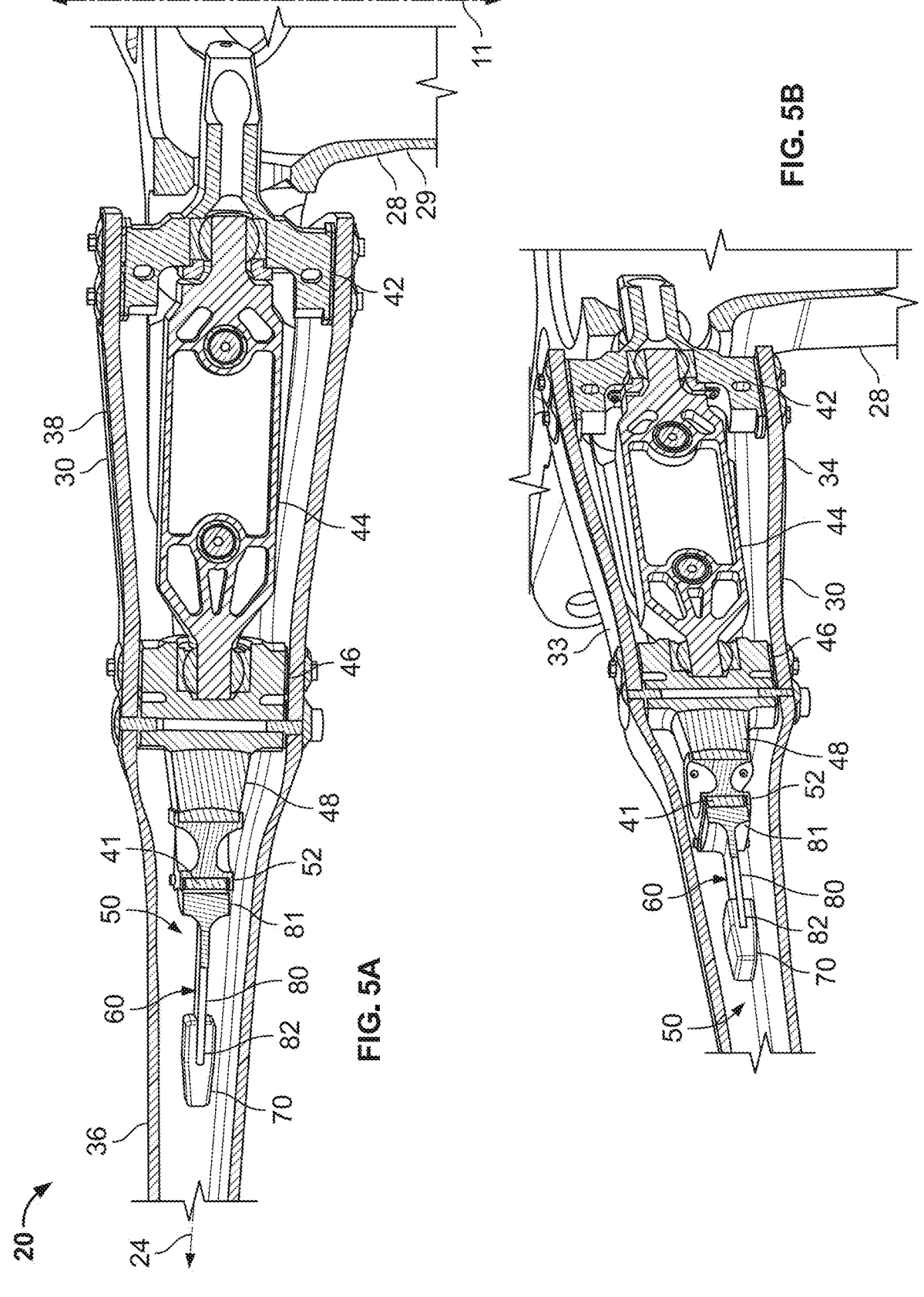
FIGS. 5A-5B are cross-sectional views of a portion of a rotor system with a pendulum mass structure in different positions according to another embodiment.

FIGS. 5A-5B show another embodiment of an internal damper assembly 50 in which the damper assembly 50 is a cantilever absorber that fits within the relatively narrow space constraints of the rotor blade 30. In particular, the damper assembly 50 of FIGS. 5A-5B is positioned radially outward from the outboard bearing block 46 and the elastomeric trust bearing 48, in a relatively smaller region of the rotor blade 30 (such as the rotor blade body 36, rather than the blade neck 38). The damper assembly 50 of FIGS. 5A-5B is relatively narrow to avoid contact with the inner surfaces of the rotor blade 30. The pendulum mass 70 is statically or rigidly attached to the second arm end 82 of the pendulum arm 80. Rather than being attached to the base 52 via a bolt, the pendulum arm 80 is a cantilever to allow the pendulum mass 70 to have spring cantilever motion to dampen the vibration.

The damper assembly 50 is statically or rotatably attached to an outer radial side of the outboard bearing block 46 via the elastomeric trust bearing 48 and extends outwardly radially from the elastomeric trust bearing 48. The elastomeric trust bearing 48 may be rotatable or twistable relative to the outboard bearing block 46. Accordingly, as the rotor blade 30 (and thus the outboard bearing block 46) pitches about the feathering axis 24, the damper assembly 50 may not pitch with the rotor blade 30.

Figure 6:
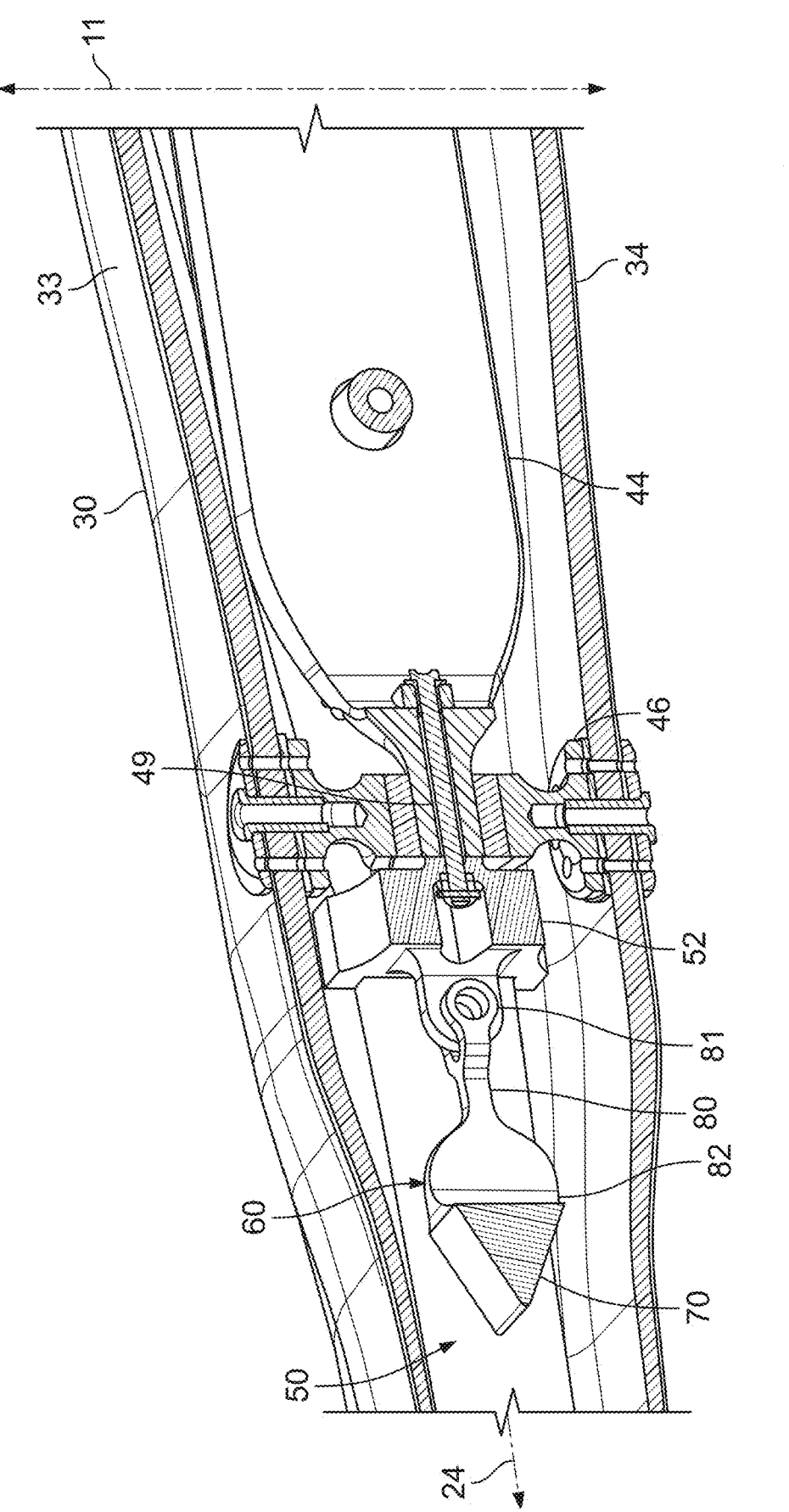
FIG. 6 is a cross-sectional view of a portion of a rotor system according to another embodiment.

FIG. 6 shows another embodiment of an internal damper assembly 50 in which the damper assembly 50 is attached to the outboard bearing block 46 via a pin or bolt 49. The bolt 49 attaches the base 52, the outboard bearing block 46 and the center block 44 together. The damper assembly 50 of FIG. 6 is positioned radially outward from the outboard bearing block 46 and outside of the center block 44 (but internally within the rotor blade 30).

FIGS. 7A-7E show another embodiment of an internal damper assembly 50 in which the damper assembly 50 is a bar linkage pendulum. The configuration of the damper assembly 50 of FIGS. 7A-7E has compact packaging and is lightweight. The damper assembly 50 is positioned within and directly attached to the rotor blade 30, rather than being attached to or positioned within the center block 44 or the bearing blocks 42, 46. Accordingly, the damper assembly 50 of FIGS. 7A-7E pitches with the rotor blade 30 as the rotor blade 30 pitches about the feathering axis 24.

Instead of including a single pendulum arm 80, the damper assembly 50 of FIGS. 7A-7E includes a plurality or set of pendulum arms 80, such as two pendulum arms 80. The two pendulum arms 80 (i.e., pendulum arm linkages) extend substantially parallel to each other between the pendulum mass 70 and the base 52. Each of the pendulum arms 80 are rotatably attached to both the base 52 and the pendulum mass 70 via their first arm end 81 and their second arm end 82, respectively, thereby maximizing the available internal space within the rotor blade 30 and creating four pivot points. The uppermost pendulum arm 80 is attached to and positioned along respective top portions of the pendulum mass 70 and the base 52. The lowermost pendulum arm 80 is attached to and positioned along respective bottom portions of the pendulum mass 70 and the base 52. This configuration allows the pendulum mass 70 to move approximately straight up and down (rather than pivoting) to dampen the vibration.

As shown in FIGS. 7C-7E, two pivot axes 64 (that are parallel and aligned with each other) extend through the joints between each of the pendulum arms 80 and their respective connection points to the base 52. As shown in FIGS. 7C-7E, the two pendulum arms 80 move in parallel relation to each other as they rotate about their respective pivot axes 64 to move the pendulum mass 70 vertically up and down relative to the base 52 to dampen out the vibration.

The base 52 (and thus the damper assembly 50) does not extend through the walls of the rotor blade 30, but instead is positioned completely within the rotor blade 30. However, the base 52 of the damper assembly 50 is firmly and robustly attached to the rotor blade 30. In particular, as shown in FIGS. 3A-3B, the base 52 includes a pivot support structure or structural mount 51 and a plurality of (preferably two) mount pads 53. The structural mount 51 provides a rigid structure for the pendulum arms 80 to pivotably attach to. The two mount pads 53 are positioned on opposite ends of the structural mount 51, between the structural mount 51 and an inner surface of rotor blade 30 (in particular, inner surfaces along the top portion 33 and the bottom portion 34 of the rotor blade 30. The mount pads 53 securely attach (via, for example, a frictional fit) the rest of the damper assembly 50 to the rotor blade 30.

As shown in FIGS. 7C-7E, the pendulum mass structure 60 is pivotable relative to the base 52 to dampen the vibration, as described further herein. In the embodiment shown in FIGS. 7C-7E, the first portion 61 of the pendulum mass structure 60 (that abuts the lower stop 58 in the lowermost position as shown FIG. 7C) is a lower surface of the lowermost pendulum arm 80. The second portion 62 of the pendulum mass structure 60 (that abuts the upper stop 59 in the uppermost position as shown FIG. 7E) is an upper surface of the uppermost pendulum arm 80. Furthermore, the lower stop 58 corresponds to an upper surface of a lower portion of the base 52, and the upper stop 59 corresponds to a lower surface of an upper portion of the base 52.

Alternatively or additionally, the pendulum mass 70 may be configured to abut the inner surfaces of the rotor blade 30 (or the base 52) in its lowermost and uppermost positions. Accordingly, the lower surface of the pendulum mass structure 60 may correspond to the first portion 61 of the pendulum mass structure 60, and the upper surface of the pendulum mass structure 60 may correspond to the second portion 62 of the pendulum mass structure 60. The upper inner surface of the bottom portion 34 of the rotor blade 30 may correspond to the lower stop 58, and the lower inner surface of the top portion 33 of the rotor blade 30 may correspond to the upper stop 59.

External Tunable Mass Damper Assembly

According to various embodiments shown in FIGS. 8A-14, the tunable mass damper assembly 50 is an external tunable mass damper assembly such that at least a portion of (or the entirety of) the damper assembly 50 is positioned outside of the rotor blade 30. To reduce or mitigate any aerodynamic drag as a result of the external damper assembly 50, the external damper assembly 50 has a contoured, aerodynamic shape in a direction between the leading edge 31 and the trailing edge 32 of the rotor blade 30. In particular, the pendulum mass 70 has an aerodynamic shape extending between the first mass end 71 (which is the leading end of the pendulum mass 70) and the second mass end 72 (which is the trailing end of the pendulum mass 70).

Conventional aircraft with pendulum devices are articulated or semi-rigid. The external damper assemblies 50 are superior to conventional dampers at least in that the external damper assemblies 50 may be tailored for and used with a rigid (e.g., hingeless) rotor system and may be mirrored on each of the coaxial rotors. Furthermore, since the external damper assemblies 50 have an aerodynamic shape, the present external damper assemblies 50 result in less aerodynamic drag than conventional dampers which are not aerodynamically shaped. The various external damper assemblies 50 may be retrofit onto a rotor blade 30.

The damper assembly 50 may be secured to variety of different external areas of the rotor blade 30. As shown in the various embodiments, the damper assembly 50 may be installed on, positioned along, secured to, and attached to the inner radial end of the rotor blade body 36 (near or at the connection point between the rotor blade body 36 and the blade neck 38). According to one embodiment as shown in FIGS. 8B-8C and 8F, the damper assembly 50 (in particular the pendulum mass structure 60) may be attached to, positioned along, and extend along the top portion 33 of the rotor blade 30, with the pendulum mass structure 60 (specifically the pendulum arm 80) substantially aligned with the feathering axis 24. According to various other embodiments as shown in FIGS. 10A-13, the damper assembly 50 (specifically the pendulum mass structure 60) is attached to, positioned along, and extends along one of the leading edge 31 or the trailing edge 32 of the rotor blade 30, with the pendulum mass structure 60 (and specifically the pendulum arm 80) substantially aligned with and parallel to the respective one of the leading edge 31 or the trailing edge 32.

FIGS. 8A-9C show one embodiment of an external damper assembly 50 that is an "aero-bob" pendulum assembly. The first mass end 71 and the second mass end 72 of the pendulum mass 70 (e.g., the "aero-bob mass") are shaped differently from each other to form the contoured, aerodynamic shape of the damper assembly 50. In particular, the first mass end 71 has a pointed end that transitions and curves radially therefrom to a bulbous middle portion, which is the widest portion of the pendulum mass 70 along its length. From the bulbous middle portion, the pendulum mass 70 tapers gradually along its length toward the second mass end 72. Accordingly, the pendulum mass 70 has a "tear-drop" shape extending from a narrower end at the second mass end 72 to the bulbous middle portion and to the relatively more rounded first mass end 71. The pendulum mass 70 is narrower along the second mass end 72 than the first mass end 71.

The pendulum arm 80 is attached to and extends radially inward from the bulbous middle portion of the pendulum mass 70. In particular, as shown in FIG. 8G, the pendulum arm 80 is fastened to the pendulum mass 70 via attachment hardware (e.g., bolts). The pendulum arm 80 includes two extensions that extend along upstream and downstream ends of the base 52. A central pivot bolt or shaft extends through the two extensions and the base 52 to rotatably connect the pendulum arm 80 to the base 52. At least one bushing may be positioned between the pivot bolt and the structural mount 51 of the base 52.

Figures 8D, 8E:
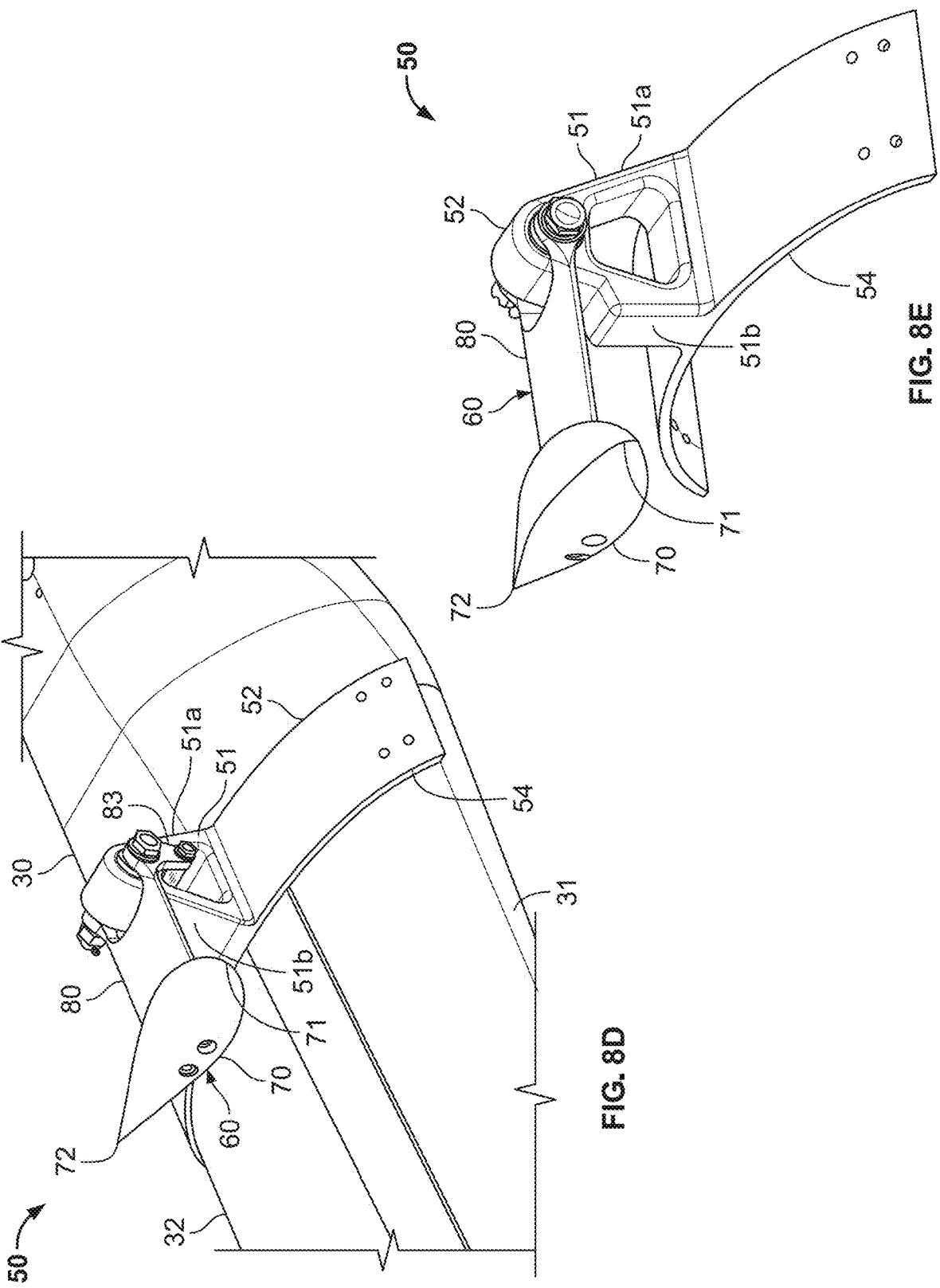
FIG. 8E is a perspective view of the damper assembly of FIG. 8B.
Figure 8F:
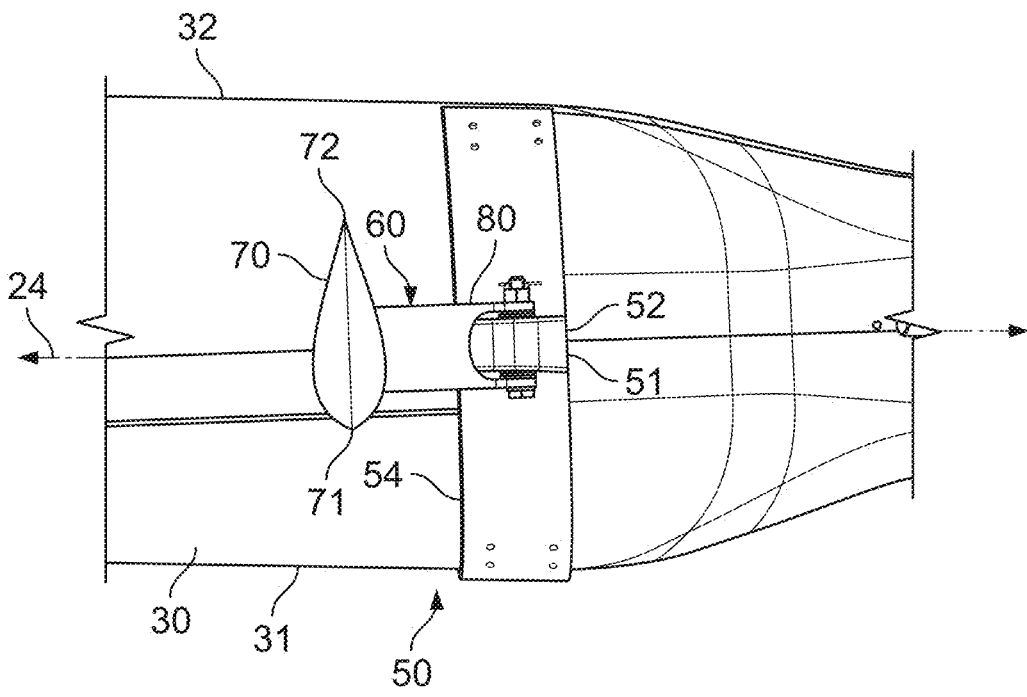
FIG. 8F is a top view of a portion of the FIG. 8B.
Figure 8G:
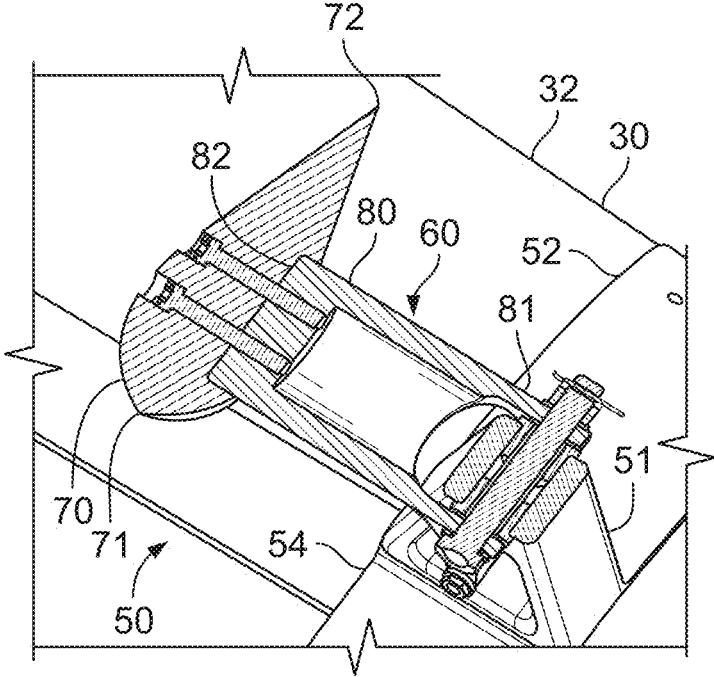
FIG. 8G is a cross-sectional view of a portion of FIG. 8B.

As shown in FIG. 8D, the base 52 includes the structural mount 51 and a mounting bracket 54. The mounting bracket 54 extends along the outer surface of the rotor blade 30 (for example, along the top portion 33) and is fastened or adhered to the rotor blade 30. The structural mount 51 provides a rigid structure for the pendulum arms 80 to pivotably attach to and extends from the mounting bracket 54 (in a direction away from the rotor blade 30, which is vertically upwards in this embodiment). The structural mount 51 includes two base extensions 51a, 51b (as shown in FIGS. 8D-8E) that are radially aligned with each other. The first base extension 51a is positioned radially inward relative to the second base extension 51b (and the second base extension 51b is positioned radially outward relative to the first base extension 51a). The base extensions 51a, 51b extend at an angle from the mounting bracket 54 and toward each other to form a hollow inner triangular area 55 with the mounting bracket 54. The pendulum arm 80 is rotatably attached to the structural mount 51 of the base 52 at the intersection of the two base extensions 51a, 51b.

The inner triangular area 55 (labeled in FIG. 9A) between the base extensions 51a, 51b of the structural mount 51 and the mounting bracket 54 is hollow or open in a direction of travel of the rotor blade 30 about the rotor axis 11 and in the direction extending between the leading edge 31 and the trailing edge 32 of the rotor blade 30. The hollow inner triangular area 55 allows the base 52 to be more aerodynamic and lightweight. Additionally, the hollow inner triangular area 55 provides an area for an arm extension 83 of the pendulum arm 80 to move within (as shown in FIGS. 9A-9C). In particular, as shown in FIGS. 8D and 9A-9C, the pendulum arm 80 includes an arm extension 83 that is positioned at least partially within the inner triangular area 55 (the arm extension 83 is not shown in all of the figures, such as FIG. 8E).

FIGS. 9A-9C show how the pendulum mass structure 60 rotates about the pivot axis 64 to move the pendulum mass 70 relative to the base 52 to dampen out the vibration. The arm extension 83 is configured to abut the inner sides of each of the base extensions 51a, 51b as the pendulum mass structure 60 moves about its entire range of motion (as shown in FIGS. 9A and 9C). Accordingly, the respective inner surfaces of the base extensions 51a, 51b (that define a portion of the hollow inner triangular area 55) define the lower stop 58 and the upper stop 59 (as described further herein). In particular, as shown in FIGS. 9A-9C, the inner surface of the first base extension 51a defines the lower stop 58, and the inner surface of the second base extension 51b defines the upper stop 59. Furthermore, the opposite sides of the arm extension 83 define the first portion 61 and the second portion 62 of the pendulum mass structure 60 (as described further herein).

FIGS. 10A-11C show another embodiment of an external damper assembly 50, which may be a halo pendulum assembly. The damper assembly 50 comprises two pendulum mass structures 60 and two corresponding bases 52, where a first (or leading edge) pendulum mass structure 60a and a first base 52a are positioned along the leading edge 31 of the rotor blade 30 and a second (or trailing edge) pendulum mass structure 60b and a second base 52b are positioned along the trailing edge 32 of the rotor blade 30, as shown in FIG. 10C. The two pendulum mass structures 60 are aligned along the same pivot axis 64.

Figure 10A:
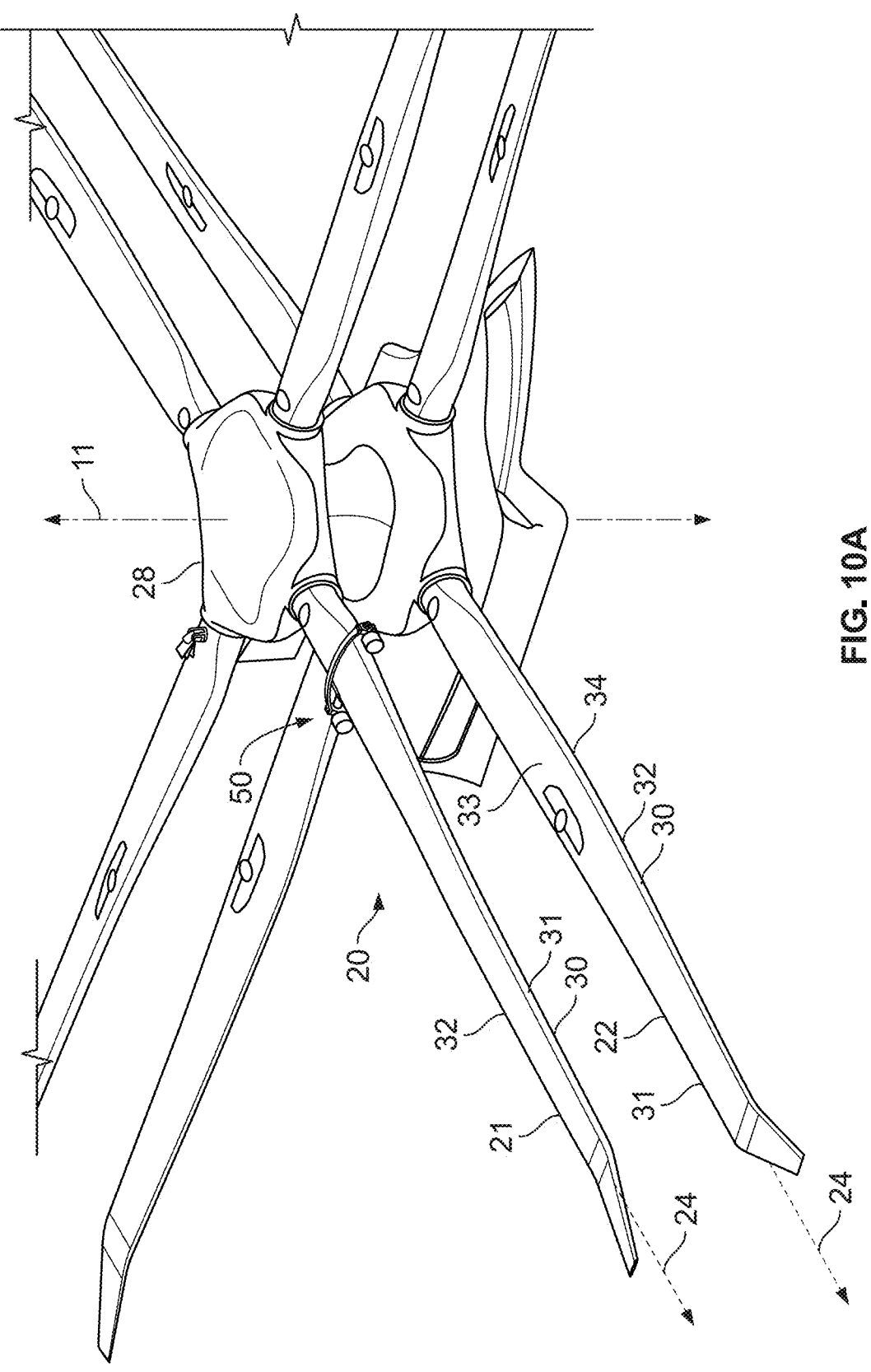
FIG. 10A is a perspective view of a rotor system according to another embodiment.
Figures 10B, 10C:
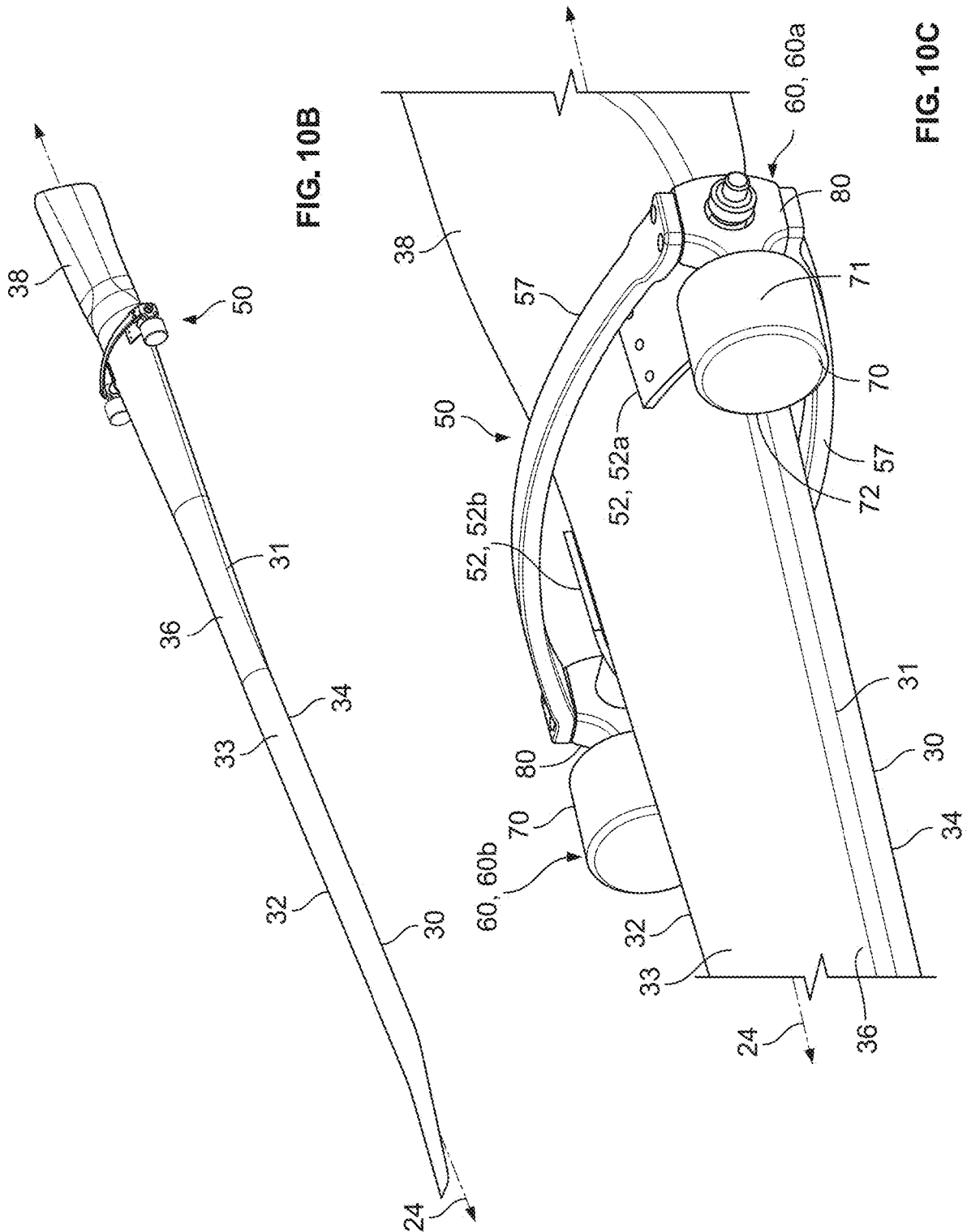
FIG. 10B is a perspective view of a rotor blade and a damper assembly of the rotor system of FIG. 10A.
FIG. 10C is a perspective view of a portion of FIG. 10B.
Figure 10D:
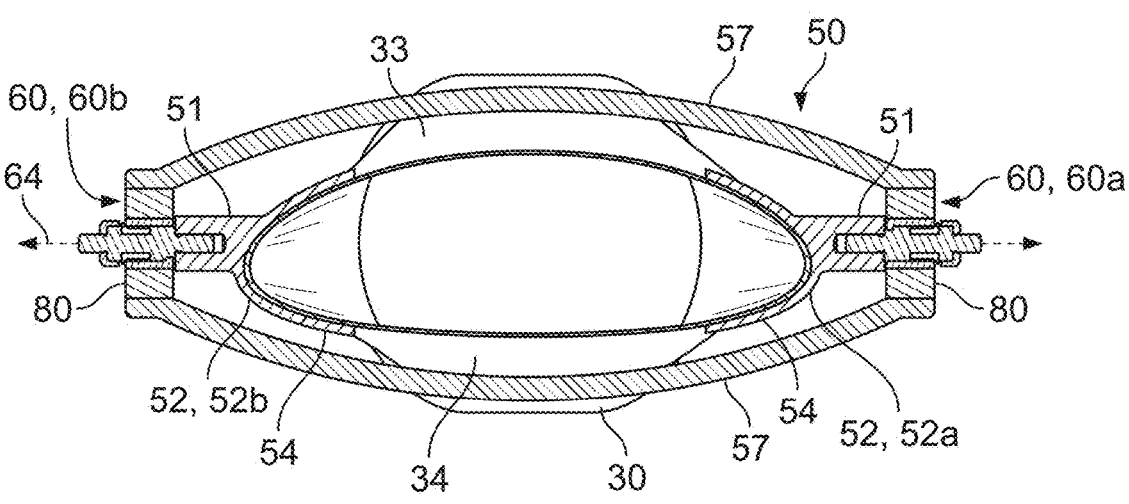
FIG. 10D is a cross-sectional view of a portion of FIG. 10B.
Figure 10E:
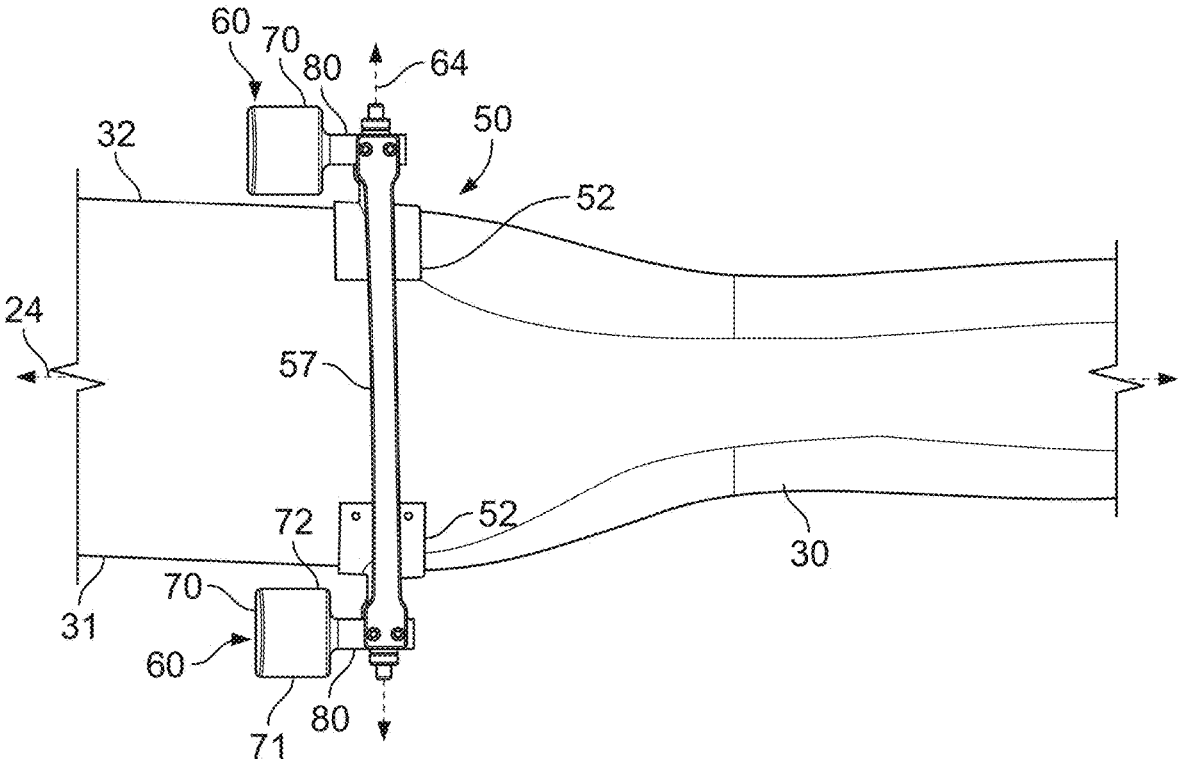
FIG. 10E is a top view of a portion of the FIG. 10B.
Figure 12:
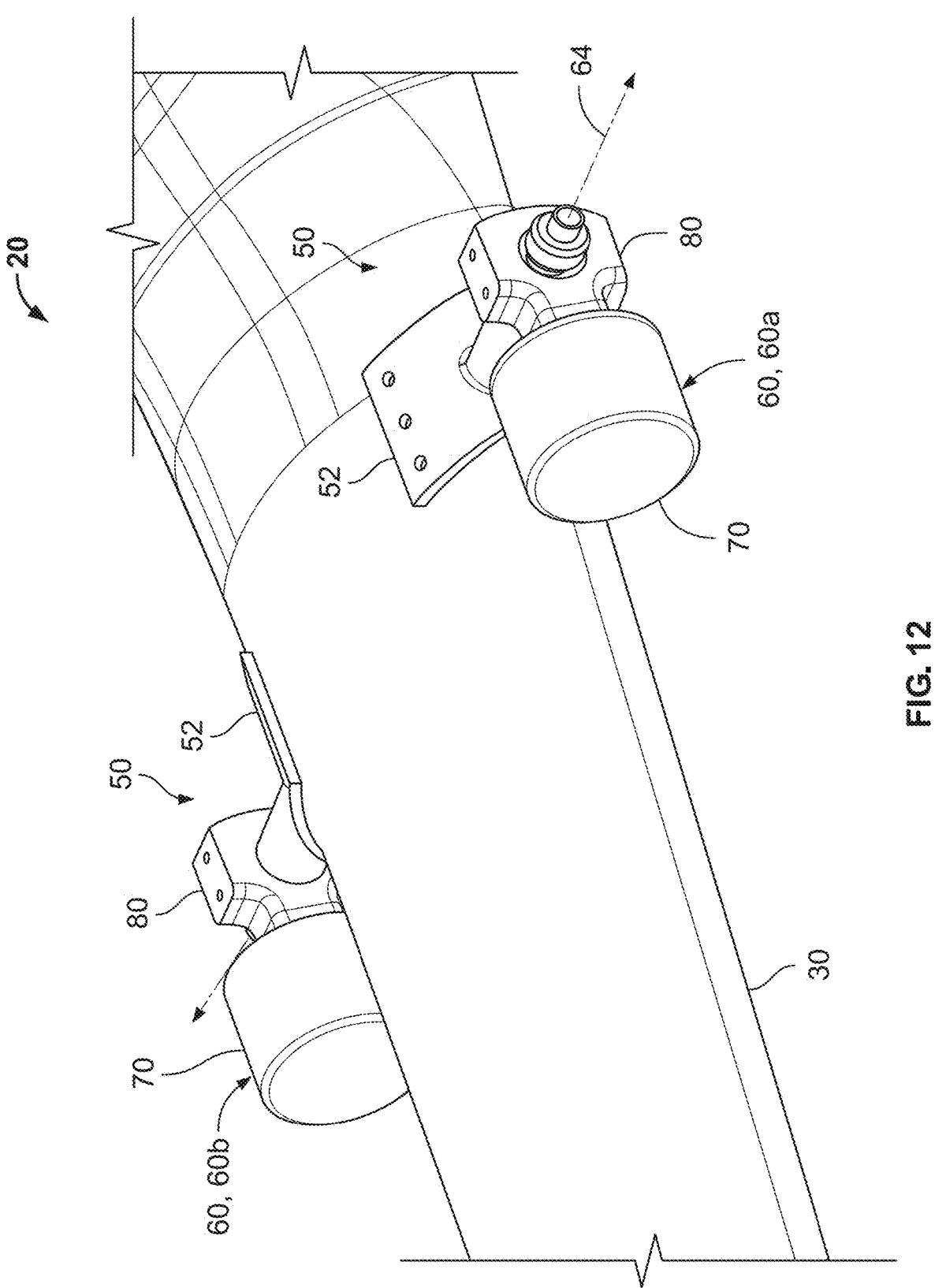
FIG. 12 is a perspective view of a portion of a rotor system according to another embodiment.

The damper assembly 50 further includes at least one connector 57 (e.g., a halo bar) that statically connects the first and second pendulum mass structures 60a, 60b together such that the first and second pendulum mass structures 60a, 60b (with the connector(s) 57) pivot together as one unit. Specifically, the connector 57 statically attaches to and extends between the two pendulum arms 80. Accordingly, the first and second pendulum mass structures 60a, 60b move congruently together as they pivot about the pivot axis 64 (as shown in FIGS. 10D-10E). As shown in FIG. 12 and described further herein, however, the connectors 57 are removable and uninstallable (as well as reattachable and reinstallable).

Optionally, as shown in FIG. 10D, the damper assembly 50 may include two connectors 57 that extend along opposite sides of the rotor blade 30 and attach to opposite sides of the two pendulum arms 80. For example, the damper assembly 50 may include an upper or top connector 57 and a lower or bottom connector 57 that extend along the top portion 33 and the bottom portion 34 of the rotor blade 30, respectively. When the pendulum arms 80 are substantially parallel to the feathering axis 24, the top and bottom connectors 57 are vertically spaced apart from the top portion 33 and the bottom portion 34 of the rotor blade 30, respectively, along their entire length to allow each of the pendulum mass structures 60a, 60b to move up and down relative to the rotor blade 30 about the pivot axis 64. By having the two connectors 57, the damper assembly 50 has a balanced center of gravity about the pivot axis 64.

To have an aerodynamic shape, each of the pendulum masses 70 of the first and second pendulum mass structures 60a, 60b has a contoured shape in the direction between the leading edge 31 and the trailing edge 32 of the rotor blade 30. In particular, the pendulum masses 70 have a cylindrical shape, where the rounded side of the pendulum mass 70 is configured to face upstream (and downstream) in the direction of rotational travel about the rotor axis 11. The flat ends of the pendulum mass 70 are approximately parallel to the direction of rotational travel about the rotor axis 11. Furthermore, the connectors 57 have a curved or arched shape between their leading end and their trailing end to follow the contour of the rotor blade 30 and be aerodynamic.

As shown in FIG. 10D, each of the first and second bases 52a, 52b includes the structural mount 51 and the mounting bracket 54, both of which are described further herein. The structural mount 51, however, extends in a horizontal direction outward from the leading edge 31 or the trailing edge 32 of the rotor blade 30 (rather than vertically upward). The pendulum arm 80 is rotatably attached to the structural mount 51 via a fastener (such as a central pivot bolt or shaft). At least one bushing may be positioned between the pivot bolt and the structural mount 51 of the base 52.

FIGS. 11A-11C show how one of the pendulum mass structures 60 and the connectors 57 pitch about the pivot axis 64 to move the pendulum mass 70 relative to the base 52 to dampen out the vibration. The other pendulum mass structure 60 moves congruently with and in the same manner as the shown pendulum mass structure 60. Opposite sides of each of the connectors 57 are configured to abut the respective portions of outer surfaces of the top portion 33 and the bottom portion 34 of the rotor blade 30 as the pendulum mass structure 60 moves about its entire range of motion (as shown in FIGS. 11A and 11C). Accordingly, an area of the outer surface of the top portion 33 of the rotor blade 30 that is radially outward from the pivot axis 64 (relative to the feathering axis 24) and an area of the outer surface of the bottom portion 34 of the rotor blade 30 that is radially inward from the pivot axis 64 both define lower stops 58 (as described further herein). Furthermore, an area of the outer surface of the top portion 33 of the rotor blade 30 that is radially inward from the pivot axis 64 and an area of the outer surface of the bottom portion 34 of the rotor blade 30 that is radially outward from the pivot axis 64 both define upper stops 59 (as described further herein).

For reference, the radial inward sides of the connectors 57 face radially inward, toward the rotor hub 28 and the rotor axis 11. The radial outward sides of the connectors 57 face radially outward, away from the rotor hub 28 and the rotor axis 11 and toward the outboard tip of the rotor blade 30. Accordingly, a radial outward side of the top connector 57 and a radial inward side of the bottom connector 57 define the first portion 61 of the pendulum mass structure 60, and a radial inward side of the top connector 57 and a radial outward side of the bottom connector 57 define the second portion 62 of the pendulum mass structure 60 (as described further herein).

FIG. 12 shows another embodiment of an external damper assembly 50, which is similar to the embodiment shown in FIGS. 10A-11C, except that the connectors 57 are not included (or have been removed or uninstalled). Accordingly, the first and second pendulum mass structure 60a, 60b are decoupled from each other and can move, pivot, or rotate about the pivot axis 64 independently of each other. The first and second pendulum mass structures 60a, 60b (and their respective first and second bases 52a, 52b) may optionally be part of two separate damper assemblies 50 that are attached to the same rotor blade 30 (and aligned along the same pivot axis 64).

FIG. 13 shows another embodiment of an external damper assembly 50 that is similar to the embodiment shown in FIG. 12, except for the shape of the pendulum masses 70. In particular, instead of having a flat, radially outward end, the pendulum masses 70 have a curved or domed end (that is opposite to the side of the pendulum mass 70 that connects to the pendulum arm 80).

FIG. 14 shows another embodiment of a damper assembly 50 that may be positioned in a variety of different areas along the rotor blade 30. Optionally, the damper assembly 50 may include a second mass 78 that is also rotatable about the pivot axis 64.

Although each of the various aspects, features, components, and configurations are not separately described for each embodiment, each of the various embodiments (including both the internal and external damper assemblies 50) disclosed herein may have any of the aspects, features, components, and configurations of the other embodiments, except where noted otherwise.

As utilized herein, the terms "approximately," "substantially," and similar terms are intended to have a broad meaning in harmony with the common and accepted usage by those of ordinary skill in the art to which the subject matter of this disclosure pertains. The terms "approximately" and "substantially" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIG-URES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied according to alternative embodiments. Other substitutions, modifications, changes and omissions may also be made in the design, operating conditions and arrangement of the various exemplary embodiments without departing from the scope of the present invention.

What is claimed is:

1. A tunable mass damper assembly attachable to a rotor blade comprising a leading edge and a trailing edge, the tunable mass damper assembly comprising:
    a base configured to be attached to the rotor blade, the base comprising two base extensions configured to extend from an outer surface of the rotor blade, the two base extensions defining two end stops and an inner area therebetween, the two base extensions supporting a portion of the base that defines a pivot axis; and
    a pendulum mass structure comprising:
        a pendulum mass; and
        a pendulum arm having a first end coupled to the pendulum mass and a second end pivotably coupled to the base about the pivot axis, the pendulum mass structure configured to pivot about the pivot axis depending on a rotational speed of the rotor blade about a rotor axis, the pendulum mass structure being configured to reduce vibratory forces of the rotor blade induced by rotation of the rotor blade about the rotor axis, wherein the pendulum arm comprises a pendulum arm extension configured to contact the two end stops to limit the rotation of the pendulum arm.

2. The tunable mass damper assembly of claim 1, wherein the pendulum mass includes a first mass end configured to be positioned closer to the leading edge of the rotor blade and a second mass end configured to be positioned closer to the trailing edge of the rotor blade, wherein the first mass end and the second mass end of the pendulum mass are shaped differently to form a contoured shape.

3. The tunable mass damper assembly of claim 1, wherein the pendulum mass structure is configured to be positioned along and move substantially perpendicular to a feathering axis of the rotor blade.

4. The tunable mass damper assembly of claim 1, wherein the pendulum mass structure is configured to be positioned on a top portion of the rotor blade.

5. The tunable mass damper assembly of claim 1, wherein the pendulum mass structure is configured to be positioned along one of the leading edge and the trailing edge of the rotor blade.

6. The tunable mass damper assembly of claim 1, wherein the rotor blade comprises a rotor blade body with the leading edge and the trailing edge and a blade neck configured to attach to a rotor hub, wherein the tunable mass damper assembly is configured to be positioned along and secured to the rotor blade body.

7. The tunable mass damper assembly of claim 1, further comprising a second pendulum mass structure positioned along the trailing edge of the rotor blade, wherein the pendulum mass structure is a first pendulum mass structure that is positioned along the leading edge of the rotor blade.

8. The tunable mass damper assembly of claim 7, further comprising a connector, wherein the first pendulum mass structure and the second pendulum mass structure are statically connected together by the connector such that the first pendulum mass structure and the second pendulum mass structure move together.

9. The tunable mass damper assembly of claim 8, wherein the connector extends along a top portion or a bottom portion of the rotor blade.

10. The tunable mass damper assembly of claim 7, wherein the first pendulum mass structure and the second pendulum mass structure are independently movable relative to each other.

11. The tunable mass damper assembly of claim 1, wherein the tunable mass damper assembly is configured to be positioned on a rotor blade that is part of at least one of a coaxial rotor system or a rigid rotor system.

12. The tunable mass damper assembly of claim 1, wherein the pendulum mass is lacrimiform in shape.

13. The tunable mass damper assembly of claim 12, wherein the pendulum mass includes a leading end forming a point at a first angle and a trailing end forming a point at a second angle smaller than the first angle.

14. The tunable mass damper assembly of claim 1, wherein the pivot axis is transverse to a feathering axis of the rotor blade.

15. The tunable mass damper assembly of claim 1, wherein the pendulum mass structure is configured to rotate freely and without restricted motion between the two end stops.

16. The tunable mass damper assembly of claim 1, wherein the inner area is hollow so as to allow airflow therethrough in the direction between the leading edge and the trailing edge of the rotor blade.

17. The tunable mass damper assembly of claim 1, wherein the base comprises a mounting bracket configured to extend along the outer surface of the rotor blade from a position adjacent the leading edge of the rotor blade to a position adjacent the trailing edge of the rotor blade.

18. The tunable mass damper assembly of claim 1, wherein the pendulum arm extends partially into the pendulum mass, the tunable mass damper assembly comprising a fastener coupling the pendulum mass to the pendulum arm.

19. The tunable mass damper assembly of claim 1, wherein the base is configured to be coupled to a top portion of the rotor blade such that the base extensions extend upward from the surface of the rotor blade.

5

* * * * *